United States Patent [19]
Maeda et al.

[11] Patent Number: 5,870,375
[45] Date of Patent: Feb. 9, 1999

[54] DISK-SHAPED RECORDING MEDIUM WITH A GROOVE SECTION HAVING A WOBBLING SIDE WALL

[75] Inventors: Shigemi Maeda, Yamatokoriyama; Kunio Kojima, Nabari, both of Japan

[73] Assignee: Sharp Kabushiki Kaisha, Osaka, Japan

[21] Appl. No.: 662,221

[22] Filed: Jun. 12, 1996

[30] Foreign Application Priority Data

Jun. 26, 1995 [JP] Japan .................................. 7-159173

[51] Int. Cl.⁶ .................................................. G11B 3/70
[52] U.S. Cl. ............................ 369/275.3; 369/30; 369/50
[58] Field of Search ................................. 369/32, 33, 47, 369/48, 50, 124, 275.3, 275.4

[56] References Cited

U.S. PATENT DOCUMENTS

| | | | |
|---|---|---|---|
| 5,210,738 | 5/1993 | Iwata et al. | 369/275.1 |
| 5,339,302 | 8/1994 | Takahashi et al. | 369/54 |
| 5,377,178 | 12/1994 | Saito et al. | 369/124 |
| 5,537,373 | 7/1996 | Horikiri | 369/44.13 |
| 5,568,459 | 10/1996 | Takamori et al. | 369/50 |

FOREIGN PATENT DOCUMENTS

| | | |
|---|---|---|
| 0 487 321 A2 | 5/1992 | European Pat. Off. . |
| 1-224929 | 9/1989 | Japan . |
| 05314538 A | 11/1993 | Japan . |
| 6-215537 | 8/1994 | Japan . |
| 6-243468 | 9/1994 | Japan . |
| 7-161045 | 6/1995 | Japan . |

*Primary Examiner*—Paul W. Huber
*Attorney, Agent, or Firm*—David G. Conlin; William J. Daley, Jr.

[57] ABSTRACT

A disk-shaped recording medium has a groove only one of whose side-walls wobbles or deviates in radial directions of the disk in order to prerecord first address information. In addition, the disk medium has block areas in the groove and in the land where the first address information is given and sector areas provided with second address information for every piece of recording data which is divided into predetermined lengths, wherein 'm' pieces of sector areas are allocated for 'n' pieces of block areas and recorded in the groove and the land (both n and m are integral numbers, and n is smaller than m). The second address information based on the first address information enables the sectors to be set at any length, and improves reliability of the address information. Moreover, the second address information realizes high density recording using both the land and the groove.

14 Claims, 21 Drawing Sheets

DISK-SHAPED RECORDING MEDIUM WITH A GROOVE SECTION HAVING A WOBBLING SIDE WALL

FIELD OF THE INVENTION

The present invention relates to a recordable disk-shaped recording medium and a disk recording or reproducing device for recording and reproducing various kinds of data into and out of a disk-shaped recording medium.

BACKGROUND OF THE INVENTION

Japanese Laid-Open Patent Application No. 1-224929/1989 (tokukaihei 1-224929) suggests and discusses in detail a configuration in which a groove functioning as a servo track wobbles in radial directions of the disk in order to increase the recording capacity of a recordable optical disk. FIG. 21 illustrates an example of such a configuration. A groove 201 functioning as a servo track (shown in FIG. 21 as the areas with slanting lines) is provided by the constant linear velocity method in advance so as to wobble in radial directions of the disk 200 (the directions R in FIG. 21) in accordance with address information modulated with respect to frequency. That address information is hereinafter referred to as the prerecorded address information.

A frequency band between the information-recording band and the tracking servo band is allocated as the wobbling frequencies, i.e., the frequency band of the prerecorded address information. For example, a format used in CDs (Compact Discs) and CD-ROMs (Compact Disc-Read Only Memories) employs a center frequency of 22.05 kHz, or about 1/10 of the lower-limit frequency of the recording information, for prerecorded address information signals. This is because the center frequency is capable of restraining affection of the recording information on the signal quality.

In a disk recording and reproducing device, the prerecorded address information is extracted from error signals obtained through tracking of the groove functioning as a servo track. Then the rotation of the disk is controlled so that the center frequency of the extracted address information equals 22.05 kHz. The rotation of a disk is thus controlled by the CLV (Constant Linear Velocity) method. In addition, the address data is obtained by demodulating the prerecorded address information. It is, in this way, possible to carry out access operation to any position over the disk, including an unrecorded area of the disk, and recording and reproduction operation. Since the linear recording density can be made constant in any part of the disk in this way, the recording capacity of such a disk is greater than conventional disks employing the CAV (Constant Angler Velocity) method.

FIG. 20 illustrates a sector allocation used in a disk when the above configuration is applied to a CD. (17a) represents an information sequence composing the prerecorded address information obtained from the groove wobbling in radial directions of the disk, (17b) represents an address allocation of the prerecorded address information in the groove, (17c) represents sectors allocated for the recording information recorded in the groove, (17d) represents an information sequence composing the sectors, and (17e) represents an information sequence composing the sub-code address information in the sectors above. The prerecorded address information is, as shown in (17a), composed of an SYNC (denoted as "a1" in FIG. 21) representing the beginning of each piece of the address information, first address data a2 representing the real address value, and a CRC (denoted as "a3" in FIG. 21), that is, a code for detecting errors in the first address data. These components of the prerecorded address information form a block as corresponding physical areas. The prerecorded address information is provided on the entire disk surface as a continuous tracking groove which wobbles in radial directions of the disk as shown in FIG. 21. Therefore, the continuous wobbling groove has, as shown in (17b), a block b1 which corresponds to a block address Pa1, a block b2 which corresponds to a block address Pa2, and so on.

Meanwhile, the recording information recorded in the groove is divided into sectors c1, c2, and so on as shown in (17c). A sector address Ga1 is allocated to the sector c1, a sector address Ga2 is allocated to the sector c2, and so on. The sector c1 corresponds to the area of the block b1, while the sector c2 corresponds to the area of the block b2. Therefore, the sector address Ga1 corresponds to the block address Pa1, while the sector address Ga2 corresponds to the block address Pa2 (Here, the "block" has the same meaning with the "sector"). As shown in (17d), an EFM (Eight to Fourteen Modulation) frame is composed of a synchronous field d1 which represents the beginning of the recording information, a sub-code field d2 which includes sub-code address information, and a data field d3 in which the recording information, error detection correction codes and the like are recorded. Ninety eight of such frames, in turn, compose each sector above. The 98 sub-code segments, taken out and connected, form sub-code address information which is composed of a synchronous field e1 which represents the beginning of the recording information, a sub-code address field e2, and a CRC field e3 for detecting errors in the sub-code address.

Here, the physical area of the above block equals the physical area of the sector. Therefore, the value of the prerecorded address equals the value of the sub-code address. Generally, the smallest unit for recording and reproduction of user data is a group called a sector. Nevertheless, in the disk having the above configuration, (1) a unit where the prerecorded address information (17a) is given is allocated as a sector, (2) the prerecorded address information is used as a sector number, and (3) the recording information (17d) which includes the same address value corresponding to that prerecorded address information in the form of the sub-code is located in that sector.

Japanese Laid-Open Patent Application No. 5-314538/1993 (tokukaihei 5-314538) suggests and discusses in detail a configuration in which only one of the side-walls of a groove functioning as a servo track wobbles in radial directions of the disk in order to increase the track density of an optical disk. As shown in FIG. 22, prerecorded address information is provided in advance in a disk 210 as a wobbling groove 211 (shown in FIG. 22 as the areas with slanting lines). Only one of the side-walls of the groove 211 wobbles. The groove 211 and the land 212 between adjacent parts of the groove 211 have about the same width. For these reasons, it is possible to detect address information from the groove 211 and the land 212, and to record information into the groove 211 and the land 212. The track density is thus increased.

Nevertheless, in both configurations above, since the address information is prerecorded in the wobbled configuration (an irreversible state), the sector sizes are fixed for each disk. This does not matter if the sector sizes are enough small. If the sector sizes are great, however, this causes not only a decrease in the data utilization factor but also an increase in the process time needed for recording and reproduction of data. More specifically, for example: Even when data of 500 bytes is to be recorded, one sector is still allocated for the recording. So, if the sector size is 2048 bytes and 4096 bytes, the utilization factor will be about 25% and 12.5% respectively. Moreover, the time necessary for the data to be recorded will be 4 times and 8 times respectively. An alternative way is small sectors. But, in the above case where the prerecorded address information is employed in a CD-ROM format, a sector size of 2048 bytes is set. If this is adopted with smaller sector size of 1024 bytes and 512 bytes which are used in, for example, ordinary computers, the wobbling frequency will double and quadruple, nearing the frequency band for the recording information. Therefore, the prerecorded address information cannot be adopted in formats of small sector sizes.

Moreover, it is possible to know from an error detection bits if the address data of prerecorded address information in a disk having the above configuration is correct or false. The address data, however, does not have error correction function and is not capable of performing recording and reproduction with high reliability. Some of the solutions for this problem are: adding error detection bits to prerecorded address information, and multiple recording address data. These solutions are, however, can not avoid increasing the number of bits allocated for the prerecorded address information, thereby raising the wobbling frequency of the prerecorded address information, interfering the frequency band for the recording information, and affecting signal quality of the recording information. Furthermore, the prerecorded address information is extracted by a detection system of a tracking servo. Therefore, the higher frequency band of the prerecorded address information results in a higher frequency band required by the tracking servo detection system, which leads to another problem.

SUMMARY OF THE INVENTION

In view of the problems, an object of the present invention is to provide a disk-shaped recording medium of high reliability and with a large capacity which can perform recording into or reproduction out of a sector of a preferred size, and to provide a method and device for recording and reproduction of such a medium.

In order to accomplish the object, the disk-shaped recording medium in accordance with the present invention has a plurality of readable and writable block areas provided in the medium; a groove section at least one of whose side-walls wobble(s) or deviate(s) in radial directions of the medium for prerecording a first address information including first address value allocated to each of the block areas; a plurality of sector areas, provided in the block areas, of sizes smaller than each of the block areas; a second address information area for recording second address information, provided in each of the sector areas, including a second address value for distinguishing each of the sector areas from the rest of the sector areas; and a data area for recording data.

With the arrangement, the size of the block areas corresponding to the first address information prerecorded in the disk and the size of the sector areas (the units for recording and reproduction of the disk) are set separately. Therefore, it is possible to perform recording into and reproduction out of sectors of appropriate sizes for various purposes with respect to one kind of disk-shaped recording medium in which the first address information is prerecorded. As a result, even if data of a smaller size than the block areas is to be recorded, the data utilization factor does not decrease much, and it is possible to cut down the time needed for recording and reproduction of data.

Moreover, with the arrangement, the first address information which is address information of the block areas and the second address information which is address information of the sector areas are set separately. Therefore, it is possible to add the more reliable second address information as address information for the sectors. Besides, since the second address information is not prerecorded in the disk-shaped recording medium, it is possible to set the reliability of the second address information to an appropriate value for various purposes by, for example, performing multiple recording more than once and adding error detection codes.

As a result, it is possible to preform recording into and reproduction out of sectors of appropriate sizes for various purposes with respect to one kind of disk-shaped recording medium in which the first address information is prerecorded. Consequently, it is needless to prepare disk-shaped recording mediums of various sizes depending upon reliability of the address information, the sector sizes and the like. In addition, such a disk can be more freely used in respect of the reliability and the decision of the sector sizes, and contributes to lower the prices of the disk-shaped recording mediums.

Various methods may be used for prerecording the first address information into the above disk-shaped recording medium. A first example: since the block areas are provided in the groove section, each piece of the first address information may be prerecorded one-to-one into each of the block areas. A second example: the first address information allocated to a pair of block areas (i.e., (1) each of the block areas of the groove section and (2) the corresponding block area of the land section to that block area of the groove section) may be prerecorded in the groove section only one of whose side-walls wobbles or deviates in radial directions of the disk. The second example is better than the first example because the second method can increase recording density of the disk-shaped recording medium more than the first.

In addition, in the second method, it is more preferable to allocate different second address values to the groove sector area provided in the block area of the groove section and to the land sector area provided in the block area of the land section corresponding to the groove sector area.

Incidentally, for example, in a disk recording or reproducing device employing the 3 beam method for the tracking servo method, if the groove and the land have about the same width, the groove or the land may not be distinguished. However, according to the arrangement, the sectors provided in the blocks of the groove section and in the blocks of the land section are allocated different second address value from each other. Therefore, it is easy to judge easily whether the sector areas being tracked are in the groove section or in the land section.

Meanwhile, another allocation is to allocate the same second address values to the groove sector areas and the land sector areas. In this case, the first address information and the corresponding second address information are the same in the sectors in the groove section and in the land section regardless of whether the sector areas are in the groove section or in the land section. Therefore, it is easy to convert the first address information values and the second address information values.

Moreover, the first address information is preferably formed by the constant linear velocity method. As a result, in a recording or reproducing device for the disk-shaped recording medium it is possible to control the rotation of the disk by the constant linear velocity method without using neither means detecting the number of rotation of the disk nor means detecting the disk radical position. It is also possible for the recording medium to have a greater recording capacity than a recording medium made by the constant angular velocity method.

Here are two methods of recording and reproducing the above disk-shaped recording medium. The first method is to, upon recording, record the second address information and recording data in accordance with the first address information. The first method includes two steps of: (1) generating a plurality of pieces of second address information in accordance with the first address information reproduced from the disk-shaped recording medium, each piece of the second address information representing a sector which is a smaller recording and reproduction unit than the block area; and (2) recording, into the block area corresponding to the first address information as the sector, data including a piece of the second address information generated in step (1) and recording data which is divided at a predetermined length. When a disk-shaped recording medium in accordance with the first method is reproduced, recording data is read out from the sector area sector by sector after identifying an area corresponding to a desired sector in accordance with the second address information read out of each of the sectors.

Consequently, it is possible to record and reproduce the recording information sector by sector into and out of sectors of smaller sizes than the sizes of the blocks by using the first address information, and to perform sector reproduction by using the highly reliable second address information.

The second method is to, prior to recording and reproduction, initializing the disk by writing the second address information, and to record or reproduce in accordance with the second address information. The second method includes two steps of: (1) generating a plurality of pieces of second address information in accordance with the first address information reproduced from the disk-shaped recording medium, each piece of the second address information representing a sector which is a smaller recording and reproduction unit than the block area; and (2) prior to recording and reproduction of each of the sectors, recording data including a piece of the second address information generated in the step (1) and initialization data which is divided at a predetermined length as a sector into the block area corresponding to the first address information. When a disk-shaped recording medium in accordance with the second method is recorded or reproduced, data is written into or read out of the sector area sector by sector after identifying an area corresponding to a desired sector in accordance with the second address information read out of each of the sectors.

Consequently, it is possible to perform sector recording by using the highly reliable second address information, as well as to produce the effects of the first method. Therefore, the second method is more preferred when high reliability is required in both recording and reproduction. Nevertheless, since the first method does not need the initialization, it is more useful than the second method when a simple method is preferred.

Additional objects, advantages and novel features of the invention will be set forth in the description which follows. For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
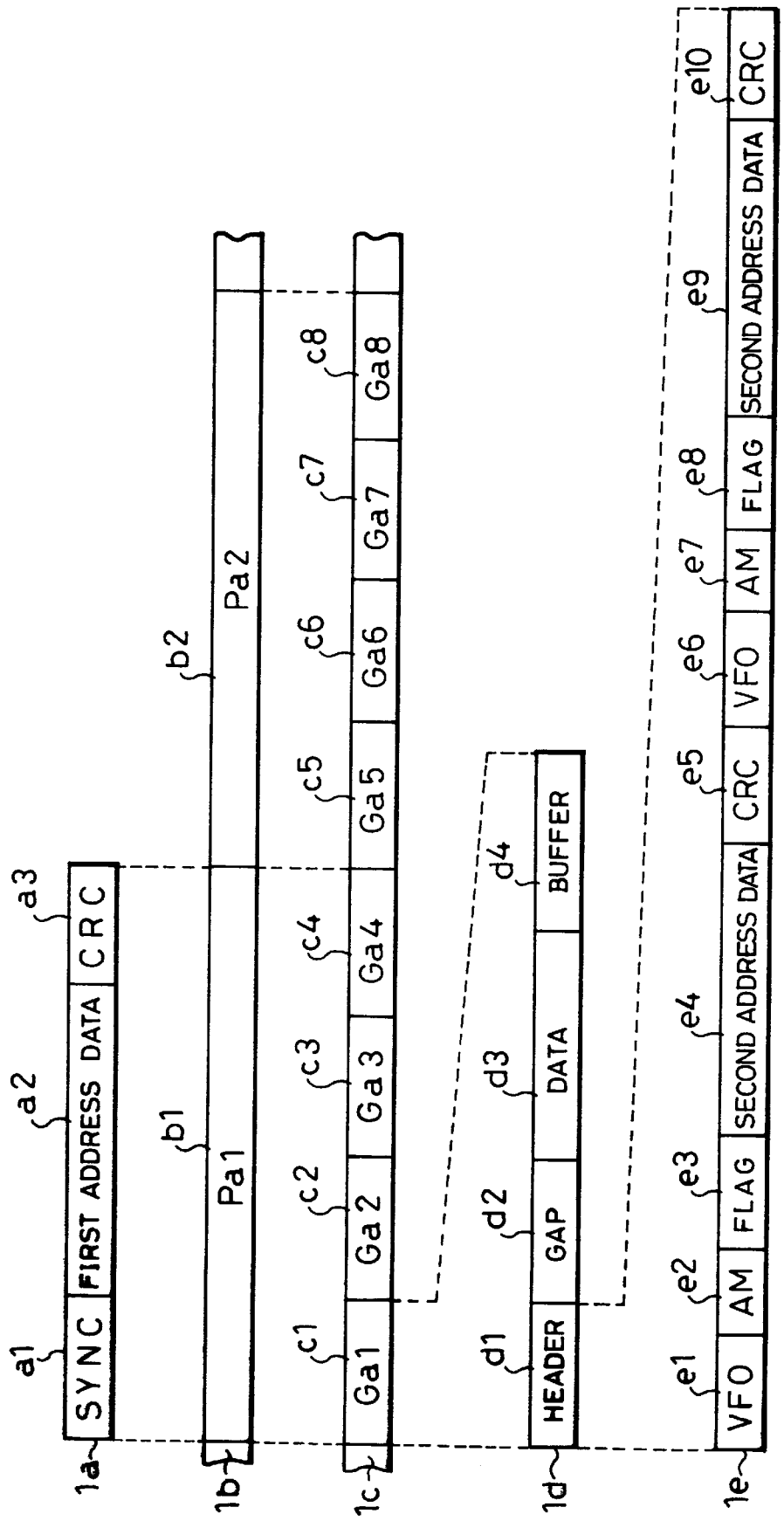
FIG. 1 is a drawing showing an arrangement of address information used in a disk-shaped recording medium of a first embodiment in accordance with the present invention.
Figure 2:
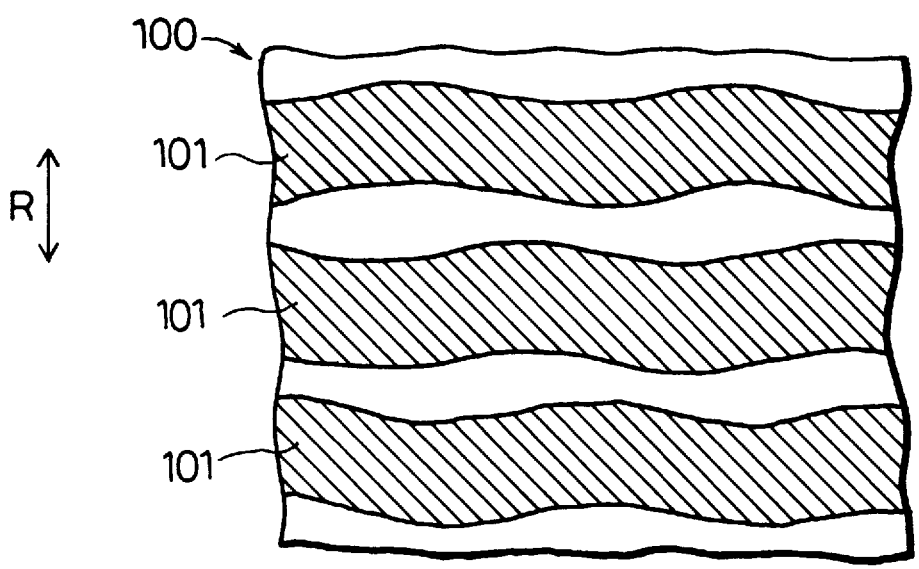
FIG. 2 is a drawing showing a configuration of a groove of the disk-shaped recording medium of the first embodiment.

Referring to FIGS. 1 and 2, the following description will discuss a disk-shaped recording medium of a first embodiment in accordance with the present invention.

FIG. 2 illustrates a configuration example of the disk-shaped recording medium. A groove 101 functioning as a servo track (shown as the areas with slanting lines in FIG. 2 for convenience of description) is formed by the constant linear velocity method in advance so as to wobble in radial directions of the disk 100 (the directions R in FIG. 2) in accordance with frequency-modulated address information, and thus carries prerecorded address information. The address information here is bi-phase-mark-modulated before being frequency-modulated. That prerecorded address information is hereinafter referred to as the first address information in order to be distinguished from second address information (described later) written into the disk 100 as recording information. A frequency band between the information-recording band and the tracking servo band is allocated as the wobbling frequencies, i.e., the frequency band of the first address information.

Here, the first address information is adopted in a format used in CDs (Compact Discs) and CD-ROMs (Compact Disk-Read Only Memories), and EFM (Eight to Fourteen Modulation) is used as the recording information. Therefore, the frequency band of the recording information is approximately in a range of 200 kHz to 720 kHz, while the frequency of the first address information employs a center frequency of 22.05 kHz, or about 1/10 of the lower-limit frequency of the recording information, for first address information signals. This is because the center frequency is capable of restraining affection of the recording information on the signal quality. The first address information used here is composed of synchronous signals, address data and error detection bits, and has a configuration in accordance with the value of the sub-code address information which includes 98 frames as one unit and is employed in the conventional-type format of CDs and CD-ROMs.

FIG. 1 illustrates an arrangement of address information used in the above disk-shaped recording medium. (1a) represents an information sequence composing the first address information obtained from the groove 101 functioning as a servo track and wobbling in radial directions of the disk, (1b) represents an address allocation of the first address information in the groove, (1c) represents sectors allocated for the recording information recorded in the groove, (1d) represents an information sequence composing the sectors, and (1e) represents an information sequence in a header composing the second address information in the sectors above.

The first address information is, as shown in (1a), composed of an SYNC (denoted as "a1" in FIG. 1) which represents the beginning of each piece of the first address information, first address data a2 representing the real address value, and a CRC (denoted as "a3" in FIG. 1) for detecting errors in the first address data. These components of the first address information form a block as corresponding physical areas. The first address information is provided on the entire disk surface as a continuous tracking groove which wobbles in radial directions of the disk as shown in FIG. 2 (the directions R in FIG. 2). Therefore, the continuous wobbling groove has, as shown in (1b), a block b1 which corresponds to a block address Pa1, a block b2 which corresponds to a block address Pa2, and so on. Meanwhile, the recording information to be recorded in the groove is divided into sectors c1, c2, c3 and so on. A sector address Ga1 is allocated to the sector c1, a sector address Ga2 is allocated to the sector c2, and so on. The sectors c1 to c4 correspond to the area of the block b1, while the sectors c5 to c8 correspond to the area of the block b2.

Therefore, the sector addresses Ga1 to Ga4 correspond to the block address Pa1, while the sector addresses Ga5 to Ga8 correspond to the block address Pa2. As shown in (1d), each of the above sectors is composed of a header field d1 which includes a sector address (i.e., second address information), a gap field d2 which is set in order to reserve time for recognizing the header in a recording and reproducing device using the disk and making a judgement, a data field d3 in which the recording information, error detection correction codes and the like are recorded, and a buffer field d4 for disabling recording into the header field in the following sector even when the rotation varies during recording. Moreover, the header field d1 is, as shown in (1e), composed of VFO fields e1 and e6 in which the recording and reproducing device using the disk carries out the bit synchronization, i.e, PLL (Phase Locked Loop), for the reproduction of the header field, AM fields e2 and e7 for identifying the beginning of the flag fields (described later) and the second address data, flag fields e3 and e8 which include attribute property information and the like of the second address data, second address data fields e4 and e9 representing sector addresses, and CRC fields e5 and e10 for detecting errors related with the flag fields, the second address data and the like.

Here, the same sector address is recorded twice as the second address information. The flag fields e3 and e8 can be allocated to provide information for a judgement whether the second address data is of the first recording (i.e., e4) or of the second recording (i.e., e9). Such a configuration of a disk-shaped recording medium permits, in the same way as in the conventional example, access operation to a desired disk area by identifying the first address even in an unrecorded area into which no recording information is recorded, and also permits the recording and reproducing device to easily control, by the constant linear velocity method, rotation of a disk in which the first address information is formed by the constant linear velocity method. A disk recording medium of a great capacity is thus obtained. Meanwhile, a sector is used as an area unit corresponding to the recording information. It is evident from the above description that a plurality of sectors compose a block corresponding to the first address information and that the sector, the smallest unit for recording and reproduction, is set regardless of the size of the block. Therefore, recording and reproduction of a desired small size is possible regardless of the size of the block. Even if data of a small size is to be recorded as recording information, the data utilization factor does not decrease much, and it is possible to use the disk efficiently. Since every sector is provided with the second address information, the reliability in identifying the sectors can be improved compared with the configuration only with the first address information. Especially, compared with the signal quality of the first address information shown in the configuration employed in the above embodiment in which the groove wobbles in radial directions of the disk, the signal of the second address information, having the same quality as the recording information, can improve the reliability in detecting the addresses. Moreover, since the same address is recorded twice as the second address information, the reliability is even more improved.

Second Embodiment

Figure 3:
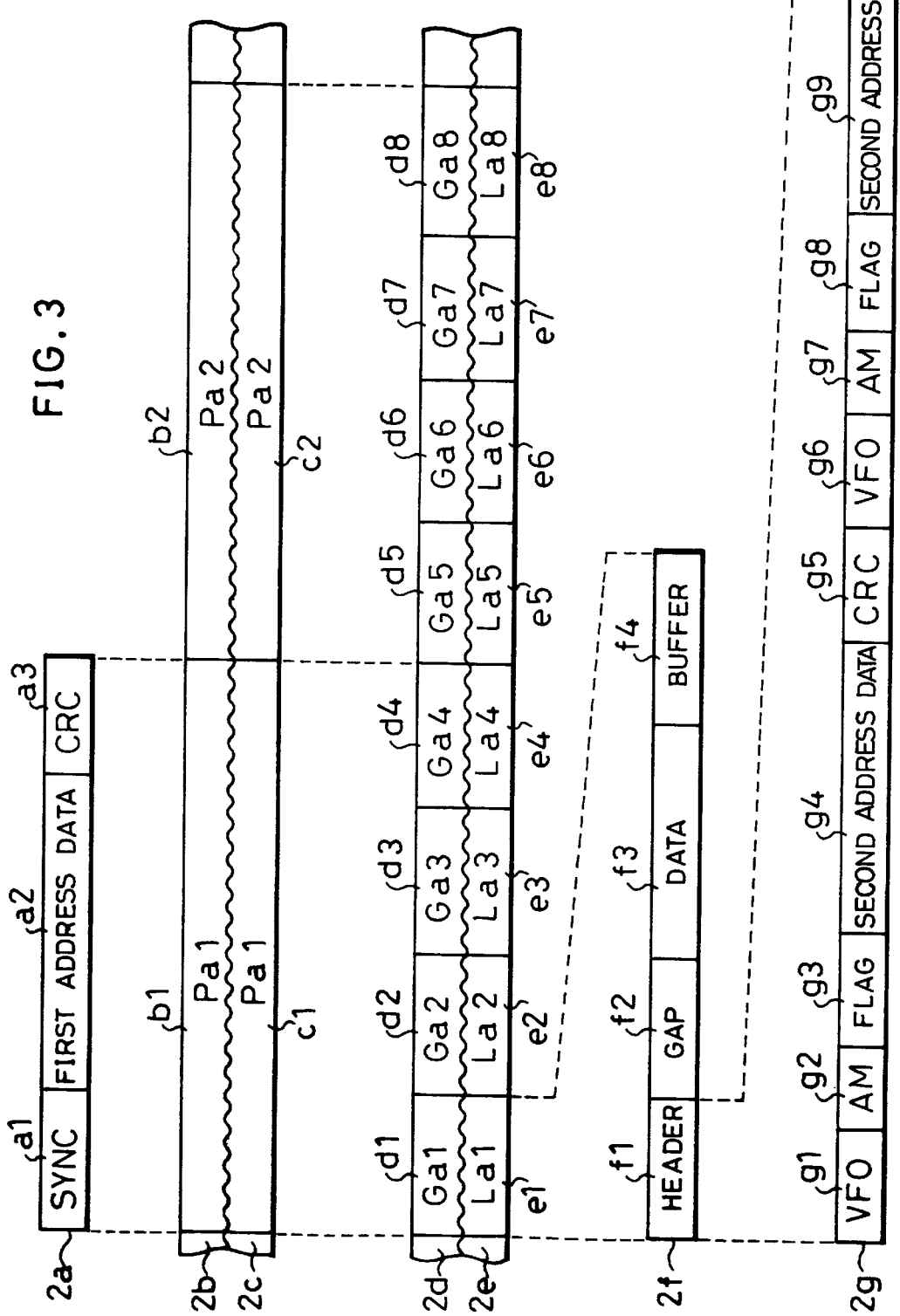
FIG. 3 is a drawing showing an arrangement of address information used in a disk-shaped recording medium of a second embodiment in accordance with the present invention.
Figure 4:
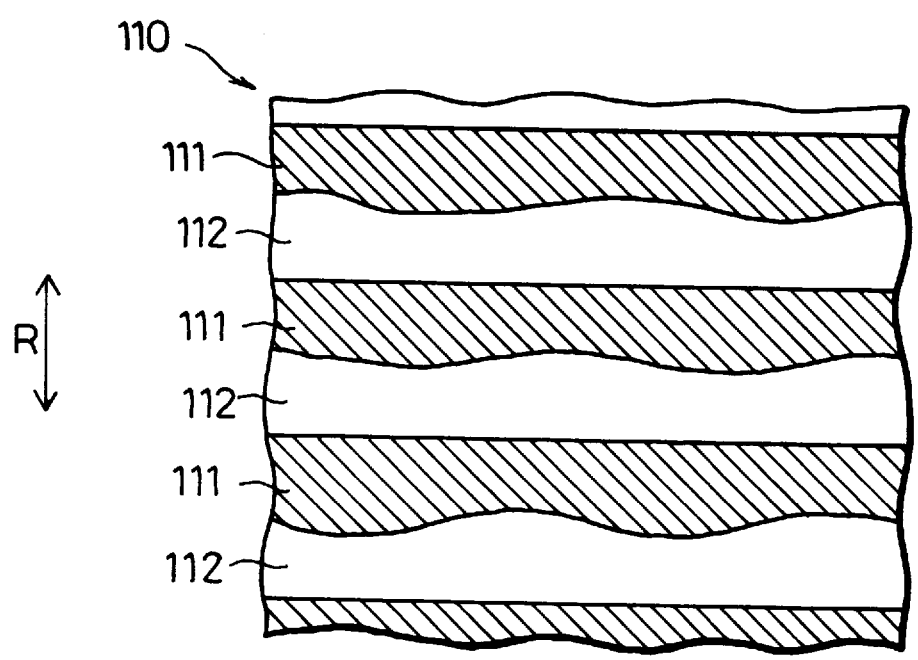
FIG. 4 is a drawing showing a configuration of a groove of the disk-shaped recording medium of the second embodiment.

Referring to FIGS. 3 and 4, the following description will discuss a disk-shaped recording medium of a second embodiment in accordance with the present invention.

As shown in FIG. 4, in the disk-shaped recording medium of the present embodiment, first address information is provided in advance in the disk 110 as a wobbling groove 111 (shown as areas with slanting lines in FIG. 4 for convenience of description). Only one of the side-walls of the groove 111 wobbles in radial directions of the disk (the directions R in FIG. 4). The groove 111 and the land 112 between adjacent parts of the groove 111 have about the same width. For these reasons, it becomes possible to detect address information from the groove 111 and the land 112, and to record information into the groove 111 and the land 112. The track density is thus increased compared with the disk-shaped recording medium of the first embodiment.

FIG. 3 illustrates an arrangement of address information used in the disk-shaped recording medium of the present embodiment. (2a) represents an information sequence composing the first address information obtained from the groove wobbling in radial directions of the disk, (2b) and (2c) represent an address allocation of the first address information in the groove and the adjacent part of the land, (2d) and (2e) represent sectors allocated for the recording information recorded in the groove and the adjacent part of the land, (2f) represents an information sequence composing the sectors, and (2g) represents an information sequence in a header composing the second address information in the sectors above.

The first address information is, as shown in (2a), composed of an SYNC (denoted as "a1" in FIG. 3) representing the beginning of each piece of the first address information, first address data a2 representing the real address value, and a CRC (denoted as "a3" in FIG. 3) for detecting errors in the first address data. These components of the first address information form a block as corresponding physical areas. The first address information is, as previously noted, provided on the entire disk surface as a continuous tracking groove only one of whose side-walls wobbles in radial directions. Therefore, the continuous wobbling groove has, as shown in (2b), a block b1 which corresponds to a block address Pa1, a block b2 which corresponds to a block address Pa2, and so on: the adjacent part of the land to the continuous wobbling groove has, as shown in (2b), a block c1 which corresponds to a block address Pa1, a block c2 which corresponds to a block address Pa2, and so on. That is, the first address information provided in advance in the groove (2b) has a configuration in which, for example, only the outer side-wall of the groove wobbles in radial directions of the disk. The first address information in the part of the land (2c) adjacent to that part of the groove, in accordance with the above configuration of the groove, has a configuration in which only the inner side-wall of the groove wobbles in radial directions of the disk. Therefore, the same value is obtained from the first address in the block b1 of the groove and from the first address in the block c1 of the corresponding land: and the same value is obtained from the first address in the block b2 of the groove and from the first address in the block c2 of the corresponding land. Meanwhile, the recording information recorded in the groove is, as shown in (2d), divided into sectors d1, d2, d3 and so on. A sector address Ga1 is allocated to the sector d1, a sector address Ga2 is allocated to the sector d2, and so on. The sectors d1 to d4 correspond to the area of the block b1 of the groove, while the sectors d5 to d8 correspond to the area of the block b2 of the groove. Therefore, the sector addresses Ga1 to Ga4 correspond to the block address Pa1 in the groove, while the sector addresses Ga5 to Ga8 correspond to the block address Pa2 in the groove.

Similarly, the recording information recorded in the land is, as shown in (2e), divided into sectors e1, e2, e3 and so on. A sector address La1 is allocated to the sector e1, a sector address La2 is allocated to the sector e2, and so on. The sectors e1 to e4 correspond to the area of the block c1 of the land, while the sectors e5 to e8 correspond to the area of the block c2 of the land. Therefore, the sector addresses La1 to La4 correspond to the block address Pa1 of the land, while the sector addresses La5 to La8 correspond to the block address Pa2 of the land. As shown in (2f), each of the sectors of the groove and of the land is composed of a header field f1 which includes a sector address (i.e., second address information), a gap field f2 which is set in order to reserve time for recognizing the header in a recording and reproducing device using the disk and making a judgement, a data field d3 in which the recording information, error detection correction codes and the like are recorded, and a buffer field d4 for disabling recording into the header field in the following sector even when the rotation varies during recording.

Moreover, the header field f1 is, as shown in (2g), composed of VFO fields g1 and g6 in which the recording and reproducing device using the disk carries out the bit synchronization for the reproduction of the header field, AM fields g2 and g7 for identifying the beginning of the flag fields (described later) and the second address data, flag fields g3 and g8 which include property information and the like of the second address data, second address data fields g4 and g9 representing sector addresses, and CRC fields g5 and g10 for detecting errors related with the flag fields and the second address data. Here, the same sector address is recorded twice as the second address information. The flag fields g3 and g8 can be allocated to provide information for a judgement whether the second address data is of the first recording (i.e., g4) or of the second recording (i.e., g9) and information for a judgement whether the second address data is in the groove (denoted as (2d)) or in the land (denoted as (2e)). Besides, if the same sector address value is used for the sector address of the groove and the sector address of the land which have the same first address value, the groove and the land have the same second address corresponding to the first address. Therefore, address conversion can be easily carried out.

There is another configuration of the second address information: A different value is assigned to each address in the groove and in the land. For example, the sector address values in the groove and in the land are given in an ascending order over the whole disk so that the minimum sector address value in the land follows the maximum sector address value in the groove. With this configuration, the sector address value itself can function as identification information between the groove and the land. Therefore, no special identification information is necessary in the flag field.

Such a configuration of a disk-shaped recording medium and prerecorded first address information permits, in the same way as in the conventional example, access operation to a desired disk area by identifying the first address even in an unrecorded area into which no recording information is recorded, and also permits the recording and reproducing device to easily control, by the constant linear velocity method, rotation of a disk in which the first address information is formed by the constant linear velocity method. A disk recording medium of a great capacity using both the land and the groove is thus obtained.

Meanwhile, a sector is used as an area unit corresponding to the recording information. It is evident from the above description that a plurality of sectors compose a block corresponding to the first address information and that the sector, the smallest unit for recording and reproduction, is set regardless of the size of the block. Therefore, recording and reproduction of a desired small size is possible regardless of the size of the block. Even if data of a small size is to be recorded as recording information, the data utilization factor does not decrease much, and it is possible to use the disk efficiently. Since every sector is provided with the second address information, the reliability in identifying the sectors can be improved compared with the configuration only with the first address information. Especially, compared with the signal quality of the first address information shown in the configuration employed in the above embodiment in which the groove wobbles in radial directions of the disk, the signal of the second address information, having the same quality as the recording information, can improve the reliability in detecting the addresses. Moreover, since the same address is recorded more than once as the second address information, the reliability is even more improved. In addition, the second address information includes identification information which permits a judgment between the groove and the land, and the recording and reproducing device using the disk can use the identification information for a judgement whether the track servo is over the groove or over the land. For example, in a case where the disk recording and reproducing device adopting the three beam method as the tracking servo method tracks a disk having a groove and a land of about the same width, the identification information is very useful, because the groove or the land may not be distinguished without the identification information.

Third Embodiment

Referring to FIGS. 5 through 8, the following description will discuss a disk recording and reproducing device of a third embodiment in accordance with the present invention.

Figure 5:
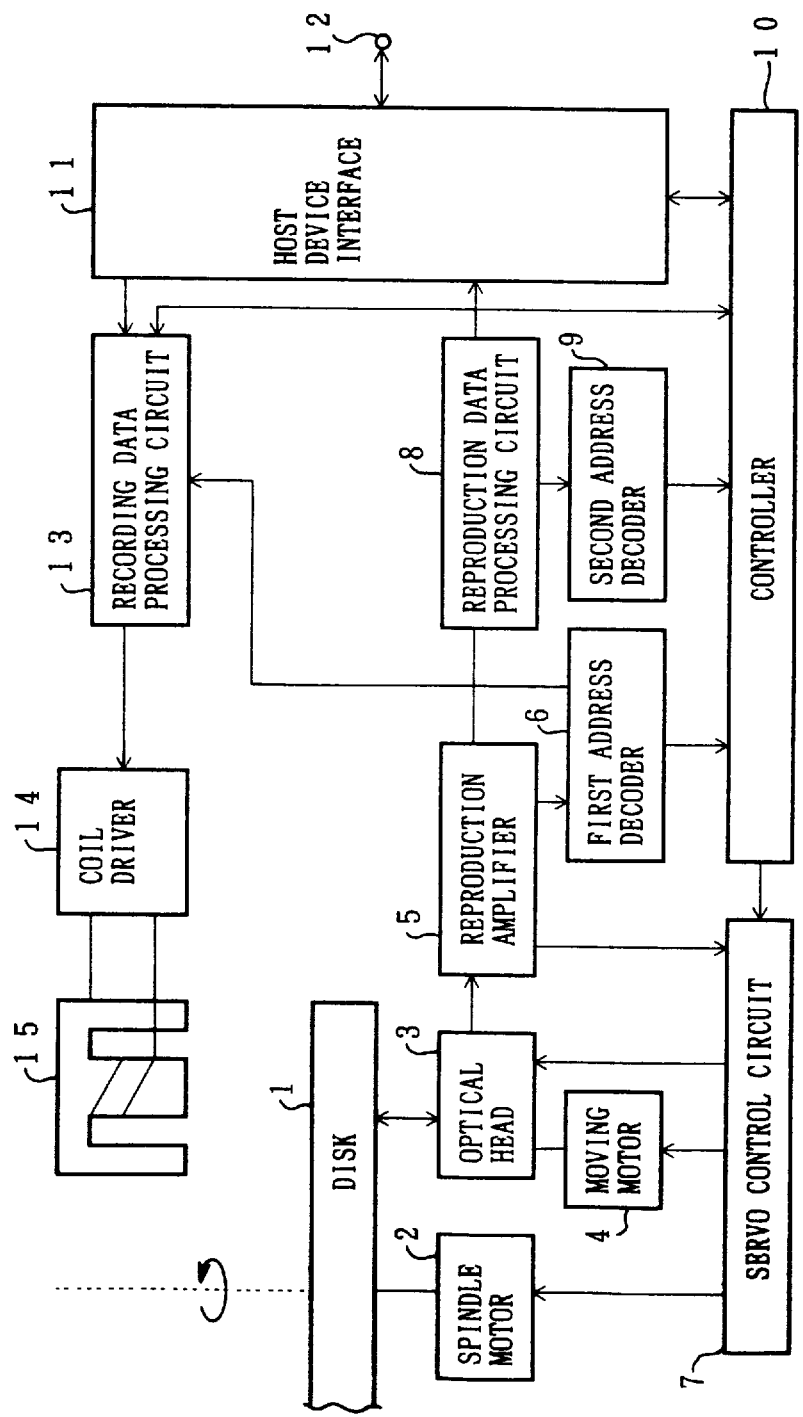
FIG. 5 is a block diagram showing a disk recording and reproducing device of a third embodiment in accordance with the present invention.

FIG. 5 shows an arrangement of a disk recording and reproducing device for recording and reproducing recording information into and out of a disk-shaped recording medium of the configuration discussed in the first embodiment. The device includes: a spindle motor 2 for supporting and driving a magneto-optical disk 1 so that the disk rotates; an optical head 3 for, during reproduction, radiating laser beams to a desired position on the rotating magneto-optical disk 1 to detect light reflected from the magneto-optical disk 1 and for, during recording, radiating laser beams of higher power than during reproduction; a reproduction amplifier 5 for generating signals of various purposes (such as a reproduction data signal, a wobbling signal and a servo error signal) by amplifying detected signals fed from the optical head 3; a magnetic head 15 for applying a magnetic field to the magneto-optical disk 1 during recording; a moving motor 4 for moving the optical head 3 and the magnetic head 15 in radial directions of the magneto-optical disk 1; a servo control circuit 7 for controlling the rotation of the spindle motor 2, the focusing and tracking of the optical head 3 and the moving of the moving motor 4 in accordance with the wobbling signal, the servo error signal and the like from the reproduction amplifier 5 and an instruction from a controller 10; a first address decoder 6 for obtaining, by demodulating and decoding the wobbling signal from the reproduction amplifier 5, address information which permits detection of the light beam position on the magneto-optical disk 1; a host device interface 11 for receiving data recording and reproduction instructions, transmitting recording and reproduced data and the like from/to a host device through a terminal 12; a recording data processing circuit 13 for generating necessary data for recording in accordance with recording data from the host device interface 11, second address data from the controller 10 and the like, and for modulating the data into a suitable form for recording; a coil driver 14 for driving the magnetic head 15 for generating a magnetic field in accordance with the recording data from the recording data processing circuit 13; a reproduction data processing circuit 8 for demodulating a reproduction data signal from the reproduction amplifier 5 and then transmitting header field to a second address decoder 9 and for correcting errors with respect to a data field; a second address decoder 9 for decoding the second address information from the reproduction data processing circuit 8 and then transmitting the second address data to a controller 10; and a controller 10 for controlling various parts of the disk recording and reproducing device. All these parts are connected as shown in FIG. 5.

Figure 6:
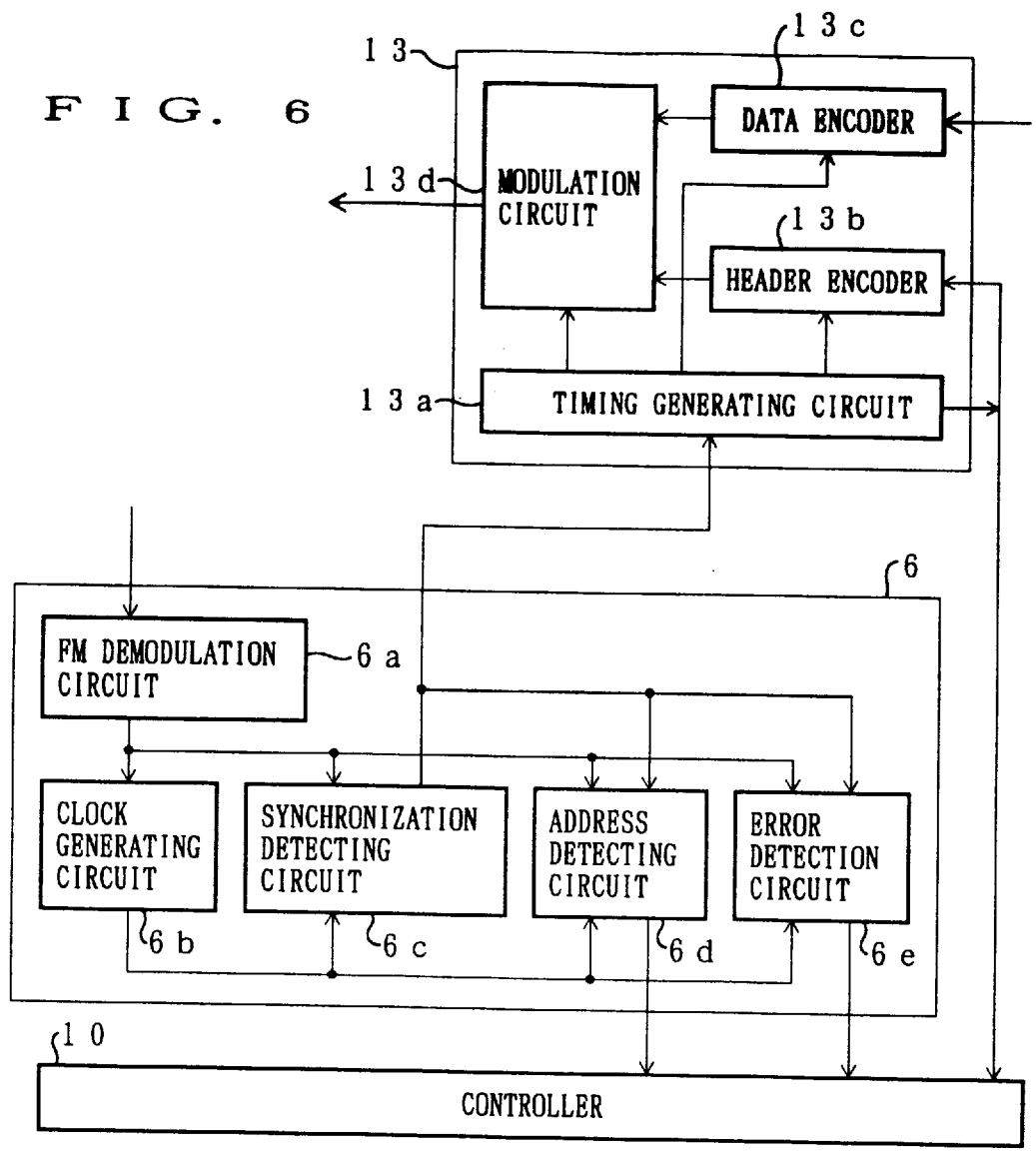
FIG. 6 is a block diagram showing in detail a first address decoder and a recording data processing circuit of the disk recording and reproducing device of the third embodiment.

FIG. 6 is a block diagram showing in more details an arrangement of the first address decoder 6 and the recording data processing circuit 13. First address information fed from the reproduction amplifier 5 is demodulated by an FM demodulation circuit 6a into a binarized bi-phase mark signal which is in turn fed into a clock generating circuit 6b, a synchronization detecting circuit 6c, an address detecting circuit 6d and an error detecting circuit 6e. The clock generating circuit 6b generates by PLL a clock synchronizing with the inputted bi-phase mark signal (i.e., the first address information), which is in turn fed into the synchronization detecting circuit 6c, the address detecting circuit 6d and the error detecting circuit 6e. The synchronization detecting circuit 6c judges by the synchronous clock the inputted bi-phase mark signal. For example, when the bi-phase mark signal agrees with the pattern specified in the SYNCa1 shown in (2a) of FIG. 1, the circuit 6c judges that the synchronization is detected and outputs a synchronization detection pulse to the address detecting circuit 6d, the error detecting circuit 6e and the recording data processing circuit 13. The address detecting circuit 6d detects first address data a2 shown in (2a) of FIG. 1 from the first address information in accordance with the synchronization detection pulse out of the synchronization detecting circuit 6c. The detected first address data a2 is then transmitted to the controller 10 as the first address value. The error detecting circuit 6e detects, referring to the synchronization detection pulse from the synchronization detecting circuit 6c as the reference timing, errors in the first address information and sequentially transmits information on whether or not the results of the address detection are correct to the controller 10.

Meanwhile, the recording data processing circuit 13 is composed of: a timing generating circuit 13a for generating various timing data signals necessary for recording and outputting, in accordance with time passing for one block unit, sector counting information showing which sector is now being processed; a header encoder 13b for generating a header field showing the second address information from the second address data and the like out of the controller 10 in accordance with the timing signals out of the timing generating circuit 13a; a data encoder 13c for generating a data field by generating and adding an error correction code to the recording data out of the host device interface 11; and a modulation circuit 13d for modulating the header field information out of the header encoder 13b or the data field information out of the data encoder 13c into a suitable form for recording. With the arrangement, in recording operation, the timing generating circuit 13a of the recording data processing circuit 13 is controlled in accordance with the synchronization detection pulse detected from the first address information. More specifically, the timing generating circuit 13a is sequentially synchronized in accordance with the synchronization detection pulse of the first address information so that the block area shown in (1b) of FIG. 1 and the sector area shown as recording information in (1c) of FIG. 1 correspond to each other. In the present embodiment, four sectors are allocated to one block. The blocks shown in (1b) are synchronized with the sectors shown in (1c) by inputting once for every four sectors a synchronization detection pulse of the first address information into the timing generating circuit 13a.

Meanwhile, the timing generating circuit 13a outputs the sector counting information, which is initialized by the synchronization detection pulse of the first address information and fed to the controller 10 as sector information which adds up for every sector. More specifically, for example, referring to (1c), the counting number "0" is given to the sectors c1, c5 and so on: the counting number "1" is given to the sectors c2, c6 and so on: the counting number "2" is given to the sectors c3, c7 and so on: the counting number "3" is given to the sectors c4, c8 and so on. The controller 10, using the sector counting information, can know sector timing in the blocks and perform recording sector by sector, including the header. The recording can be even started in the middle of a block. Note that the description here discusses an arrangement in which the recording data processing circuit 13 is synchronized under the condition that the synchronization detection signal of the first address information is detected. Nevertheless, the condition to make valid the synchronization detection pulse transmitted to the recording data processing circuit 13 may be that the results of the error detection in the first address information is correct, or that synchronization detection pulses are detected from a plurality of blocks. Under these conditions, the reliability of the synchronization of the recording data in accordance with the first address information can be improved.

The following description will discuss an embodiment of recording and reproduction operation by a disk recording and reproducing device having the above arrangement.

Figure 7:
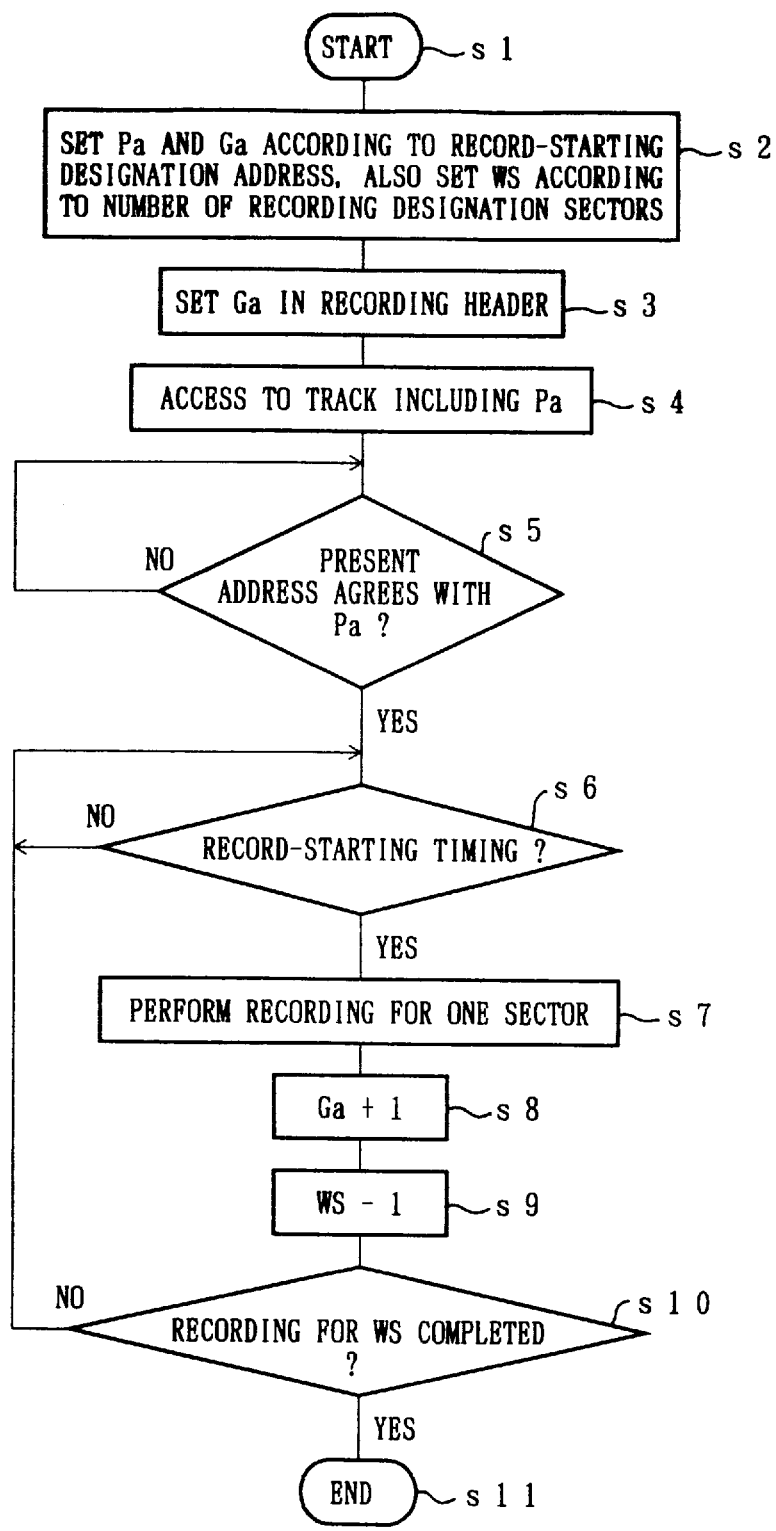
FIG. 7 is a flow block diagram showing recording operation of the disk recording and reproducing device of the third embodiment.

FIG. 7 is a flow block diagram showing the flow of the recording operation by the disk recording and reproducing device.

When a recording instruction is given from a host device through the terminal 12, the controller 10 recognizes the recording instruction through the host device interface 11 and starts processes for the recording operation (s1). In (s2), the controller 10 sets the recording block address Pa corresponding to the first address information and the recording sector address Ga corresponding to the second address information according to the record-starting designation sector address designated by the host device, and also sets the designated number of recording sectors as "WS". The designation here, as shown in FIG. 1, discusses a configuration in which four sectors are allocated to one block. For example, the block address value is set to ¼ of the sector address value. Next, in (s3), the controller 10 sets the Ga in the recording data processing circuit 13 as the second address data which is to be located at the beginning of the sector. In (s4), the controller 10 performs access operation to a track including the Pa, i.e., the block position where the recording is to be performed.

Referring to the access operation, the controller 10 moves the light beam to a desired position by recognizing the present first address obtained sequentially from the first address decoder 6 and controlling the moving motor 4 and the optical head 3 through the servo control circuit 7. Next, in (s5), it is judged whether or not the present first address obtained from the first address decoder 6 agrees with the Pa.

If it agrees, the operation proceeds to (s6), wherein it is judged whether or not the sector counting information obtained from the recording data processing circuit 13 agrees with the record-starting timing. If it is judged in (s6) that the sector counting information agrees with the timing for the sector where the recording is to be performed, the operation proceeds to (s7), wherein the sector-by-sector recording is started. Here, while the following recording is performed, the block corresponding to the first address information and the sector corresponding to the second address information are always in synchronization. This is because, as noted above, the timing generating section in the recording data processing circuit 13 is synchronized in accordance with the results of the synchronization detection by the first address decoder 6. In (s7), the recording data processing circuit 13 generates the header field d1 including the second address data Ga given by the controller 10 as the sector data of the arrangement shown in (1d) and (1e) of FIG. 1. The recording data processing circuit 13 also generates the data field g58 d3 shown in FIG. 1 by dividing the recording data still inputted at the terminal 12 through the host device interface 11 from the host device into predetermined sector sizes (e.g., 512 bytes), and then generating error correction codes and the like to be added to the data.

Next, these generated data sequences are transmitted to the coil driver 14 as data for one sector modulated by the modulation circuit 13d. The magnetic head 15 applies a modulated magnetic field in accordance with the sector data, while the optical head 3 radiates a light beam having power necessary for the recording. The desired sector data is thus recorded. After the recording of one sector is finished in (s7), the value of the Ga (i.e., the recording second address information) is changed and then set in the head encoder 13b as the second address information in (s8). Then, the number of recording sectors WS is reduced by one in (s9). In (s10), it is judged, by judging whether or not the WS equals 0, whether or not the recording operation is finished with respect to the designated number of sectors. If the recording is finished here, the operation proceeds to (s11), and the recording processes are ended. On the other hand, if the recording is not finished yet, the operation goes back to (s6), and the above operation is repeated until the recording is completed with respect to the number of sectors designated by the host device.

Figure 8:
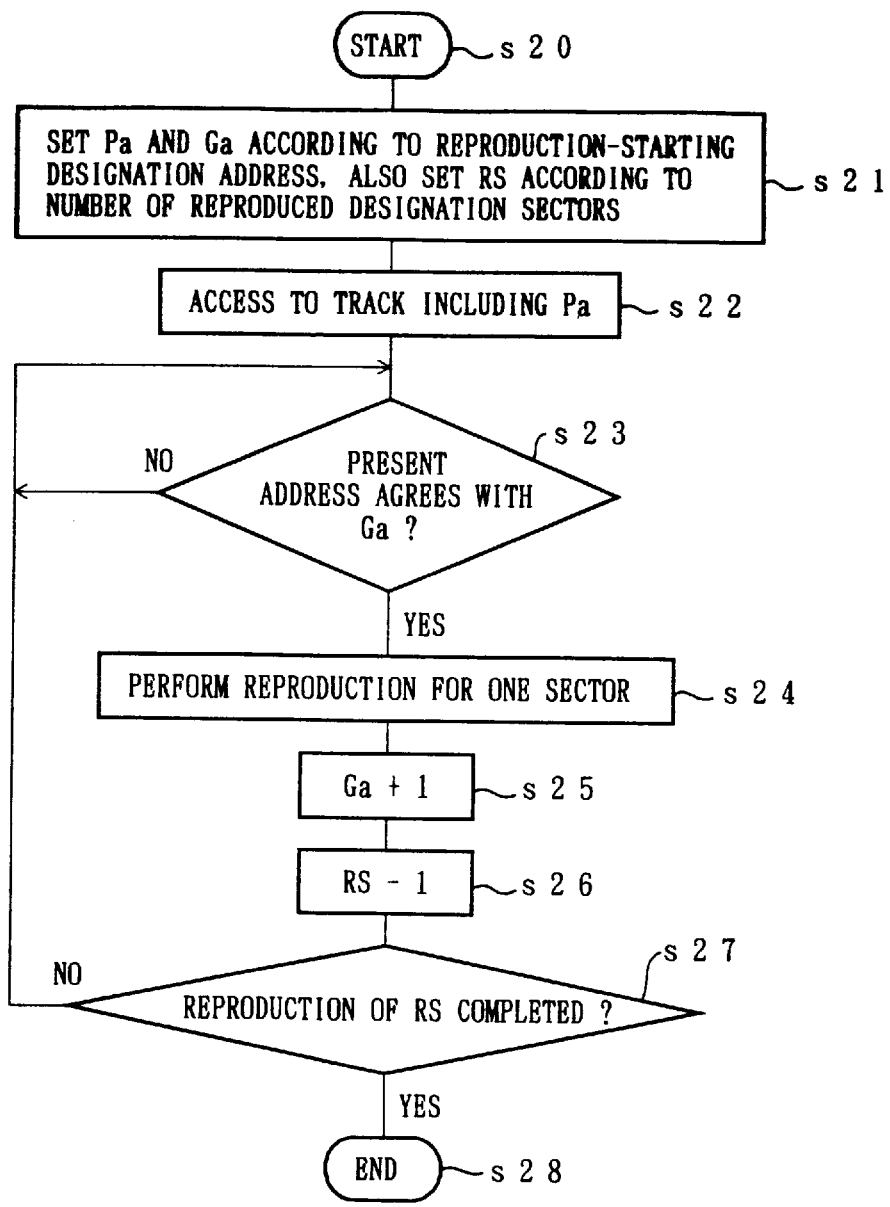
FIG. 8 is a flow block diagram showing reproduction operation of the disk recording and reproducing device of the third embodiment.

The following description will discuss the reproduction operation. FIG. 8 is a flow block diagram showing the flow of the reproduction operation by the disk recording and reproducing device.

When a reproduction instruction is given from a host device through the terminal 12, the controller 10 recognizes the reproduction instruction through the host device interface 11 and starts processes for the reproduction operation (s20). In (s21), the controller 10 sets the reproduction block address Pa corresponding to the first address information and the reproduction sector address Ga corresponding to the second address information according to the reproduction-starting designation address designated by the host device, and also sets the designated number of reproduced sectors as "RS". In (s22), the controller 10 performs access operation to a track including the Pa, i.e., the block position where the reproduction is to be performed. Next, in (s23), it is judged whether or not the present second address obtained from the second address decoder 9 agrees with the Ga. If it agrees, the operation proceeds to (s24), where the desired sector is reproduced. Specifically, the reproduction data processing circuit 8 decodes the data field, including error correction processes. The decoded and corrected data field is then transmitted to the host device through the host device interface 11 and the terminal 12. After one sector is reproduced in (s24), the reproduction second address Ga and the number of reproduced sectors RS are changed in (s25) and (s26). Then, it is judged in (s27) whether or not the reproduction processes are finished with respect to the designated number of sectors. If it is finished, the operation proceeds to (s28). If it is not finished yet, the operation goes back to (s23), and the above process is repeated until the reproduction operation is completed with respect to the desired sector.

As discussed so far, in the disk recording and reproducing device of the present embodiment, a disk recording medium having sectors of smaller sizes than the blocks can be realized by recording, into the block given by the first address information, a plurality of sectors generated by dividing recording data at a predetermined length and providing each piece of the divided recording data with second address information. Moreover, with the disk recording and reproducing device, it is possible to perform disk rotation control and access operation to unrecorded area into which no recording information is recorded by the constant linear velocity method by using the first address information, and to record and reproduce recording information sector by sector into and out of sectors having a smaller size than the blocks, as well as to perform sector reproduction by using the second address information with high reliability.

Fourth Embodiment

Figure 9:
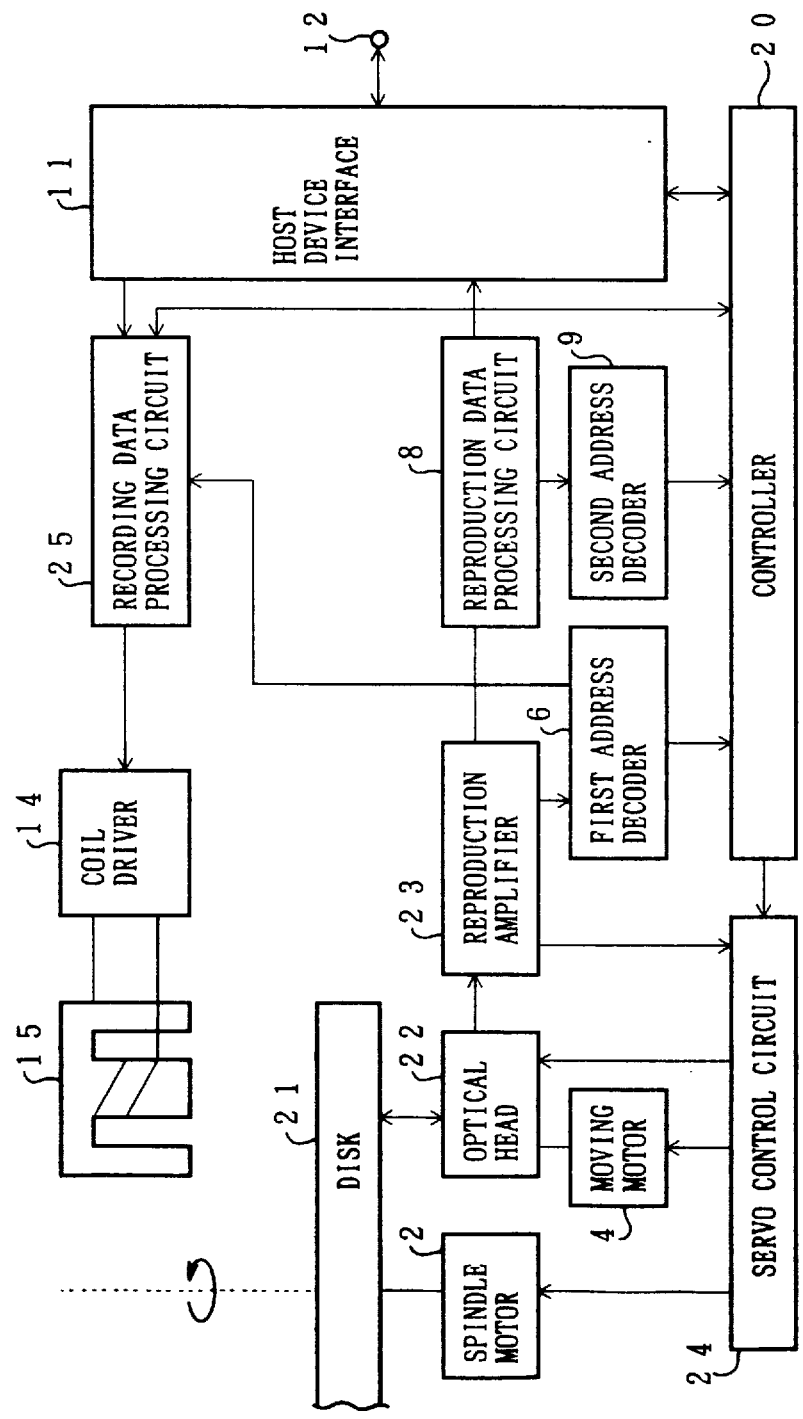
FIG. 9 is a block diagram showing a disk recording and reproducing device of a fourth embodiment in accordance with the present invention.
Figure 10:
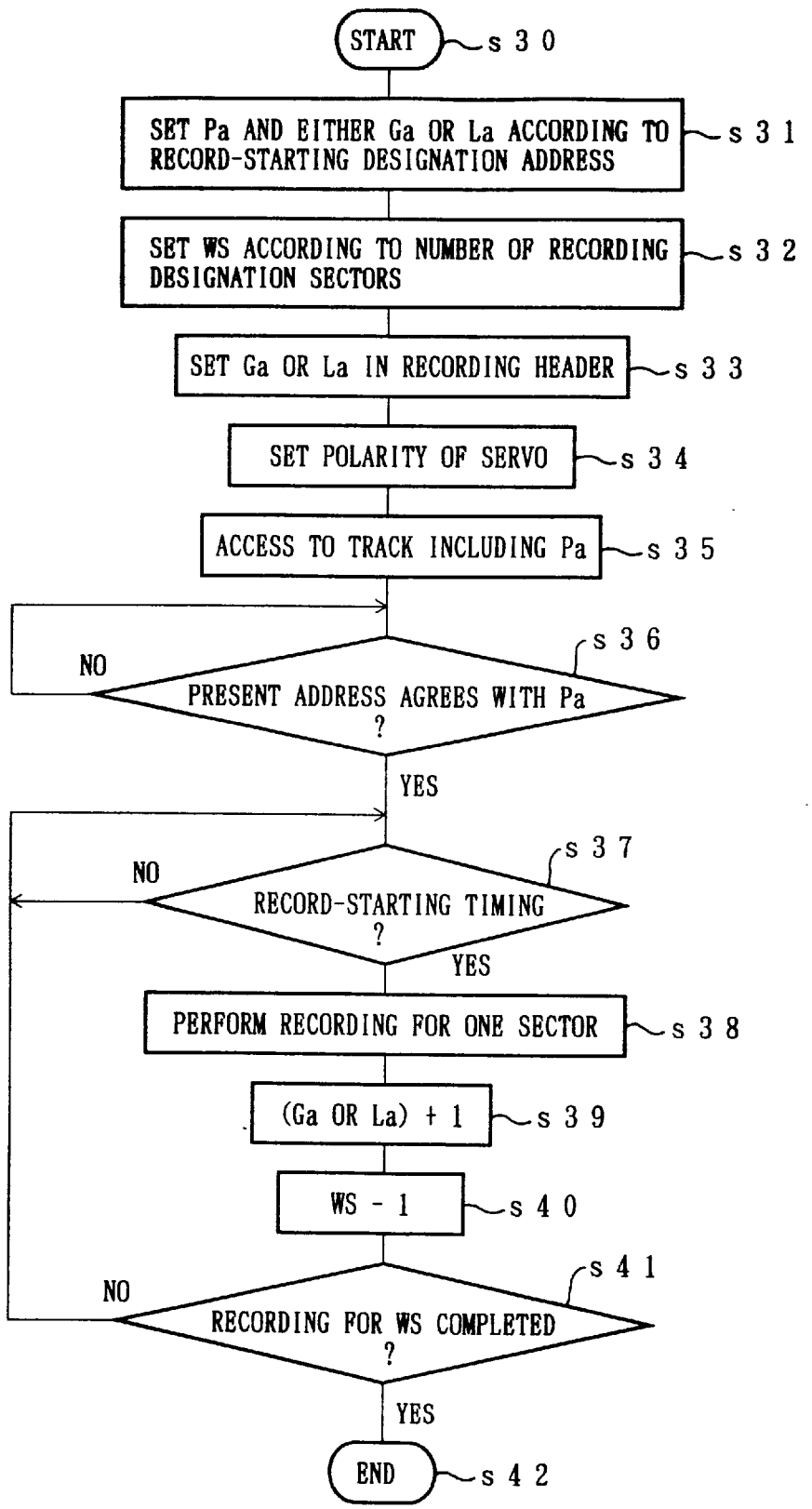
FIG. 10 is a flow block diagram showing recording operation of the disk recording and reproducing device of the fourth embodiment.
Figure 11:
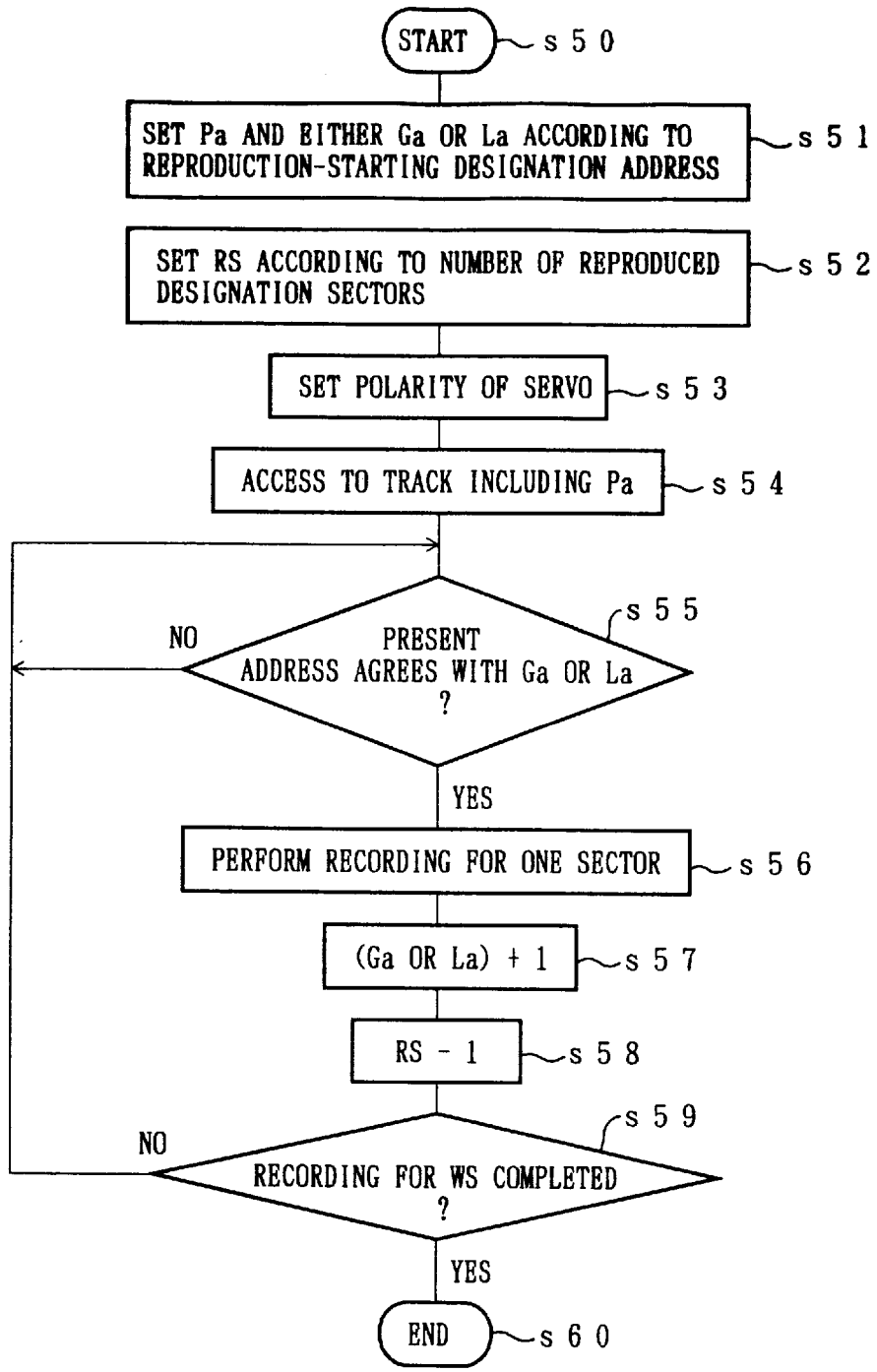
FIG. 11 is a flow block diagram showing reproduction operation of the disk recording and reproducing device of the fourth embodiment.

Referring to FIGS. 9 through 11, the following description will discuss a disk recording and reproducing device of a fourth embodiment in accordance with the present invention.

FIG. 9 shows an arrangement of a disk recording and reproducing device for recording and reproducing recording information into and out of the disk-shaped recording medium 21 of the configuration discussed in the second embodiment. The device includes: a spindle motor 2 for supporting and driving a magneto-optical disk 21 so that the disk rotates; an optical head 22 for, during reproduction, radiating laser beams to a desired position on the rotating magneto-optical disk 21 to detect light reflected from the magneto-optical disk 21 and for, during recording, radiating laser beams of higher power than during reproduction; a reproduction amplifier 23 for generating signals of various purposes (such as a reproduction data signal, a wobbling signal and a servo error signal) by amplifying detected signals fed from the optical head 22; a magnetic head 15 for applying a magnetic field to the magneto-optical disk 21 during recording; a moving motor 4 for moving the optical head 22 and the magnetic head 15 in radial directions of the magneto-optical disk 21; a servo control circuit 24 for controlling the rotation of the spindle motor 2, the focusing and tracking of the optical head 22 to a groove or a land and the moving of the moving motor 4 in accordance with the wobbling signal, the servo error signal and the like from the reproduction amplifier 23 and an instruction from a controller 20; a first address decoder 6 for obtaining, by demodulating and decoding the wobbling signal from the reproduction amplifier 23, address information which permits detection of the light beam position on the magneto-optical disk 21; a host device interface 11 for receiving data recording and reproduction instructions, transmitting recording and reproduced data and the like from/to a host device through a terminal 12; a recording data processing circuit 25 for generating necessary data for recording in accordance with recording data from the host device interface 11, second address data from the controller 20 and the like, and for modulating the data into a suitable form for recording; a coil driver 14 for driving the magnetic head 15 for generating a magnetic field in accordance with the recording data from the recording data processing circuit 25; a reproduction data processing circuit 8 for demodulating a reproduction data signal from the reproduction amplifier 23 and then transmitting a header field to a second address decoder 9 and for correcting errors with respect to a data field; a second address decoder 9 for decoding the second address information from the reproduction data processing circuit 8 and then transmitting the second address data to a controller 20; and a controller 20 for controlling various parts of the disk recording and reproducing device. All these parts are connected as shown in FIG. 9.

Note that the first address decoder 6 can employ the configuration explained in FIG. 6, and that the recording data processing circuit 25 can employ the same configuration with the recording data processing circuit 13 shown in FIG. 6. The description about details of the configuration of the first address decoder 6 and the recording data processing circuit 25 is therefore omitted. Nonetheless, in order to output header information sequences shown in (2g) of FIG. 3, the recording data processing circuit 25 of the present embodiment is different from the recording data processing circuit 13 in, for example, the method of generating the flag fields with a data encoder.

The following description will discuss an embodiment of recording and reproduction operation by a disk recording and reproducing device having the above arrangement.

FIG. 10 is a flow block diagram showing the flow of the recording operation by the disk recording and reproducing device.

When a recording instruction is given from a host device through the terminal 12, the controller 20 recognizes the recording instruction through the host device interface 11 and starts processes for the recording operation (s30). In (s31), the controller 20 sets the recording block address Pa corresponding to the first address information and the recording sector address Ga or La corresponding to the second address according to the record-starting designation address designated by the host device. Here, the sector addresses Ga and La correspond respectively to the groove (2d) and the land (2e) shown in FIG. 3, and are given by the host device as continuous block address spaces. Specifically, for example: If the groove and the land on the entire disk surface have 1,500,000 sectors respectively, the address numbers from "1" to "3,000,000" are given by the host device as logical sector addresses. The controller 20, if it receives logical sector addresses from "1" to "1,500,000", uses the values from "1" to "1,500,000" as the sector addresses for the groove without making any changes. But, if it receives logical sector addresses from "1,500,001" to "3,000,000", the controller allocates the values from "1" to "1,500,000" as the sector addresses for the land.

In other words, the sector addresses, as discussed above, are divided between the groove and the land. As a result, if the sector addresses received by the controller 20 are those for the groove, the logical sector addresses are designated as the sector addresses with no change. On the other hand, if the sector address received by the controller 20 are those for the land, the logical sector addresses are decreased by 1,5000,000 and then designated as the sector addresses. This address conversion enables the host device to handle the groove and the land as continuous sectors without distinguishing the groove and the land. Moreover, the description here discusses a configuration in which four sectors are allocated to one block as shown in FIG. 3, and it is possible to designate ¼ of the value of the Ga or La as the block address. Next, the number of recording sectors instructed from the host device is designated as "WS" in (s32). In (s33), the Ga or La obtained above as the second address data to be located at the beginning of the sector are set in the recording data processing circuit 25. In addition, identification information for the groove and the land is set as the flag fields g3 and g8 shown in (2g) of FIG. 3. Next, in (s34), the controller 20 sets the polarity of the tracking servo in accordance with the result of the above judgement whether the logical sector addresses are for the groove or the land. When the push-bull method, a commonly-used tracking servo method, is used, the tracking servo is performed with respect to the groove and the land by switching the polarity of the tracking servo. That is, the tracking servo is performed by the servo control circuit 24 setting the polarity of the tracking servo in accordance with an instruction from the controller 20.

In (s35), access operation to the groove or the land including the Pa, i.e., the block position where the recording is to be performed. Referring to the access operation, the controller 20 moves the light beam to a desired position by recognizing the present first address obtained sequentially from the first address decoder 6 and controlling the moving motor 4 and the optical head 22 through the servo control circuit 24. Next, in (s37), it is judged whether or not the sector counting information obtained from the recording data processing circuit 25 agrees with the record-starting timing. If it is judged in (s37) that the sector counting information agrees with the timing for the sector where the recording is to be performed, the operation proceeds to (s38), wherein the sector-by-sector recording is started. Here, while the following recording is performed, the block corresponding to the first address information and the sector corresponding to the second address information are always in synchronization. This is because, as noted above, the timing generating section in the recording data processing circuit 25 is synchronized in accordance with the results of the synchronization detection by the first address decoder 6.

In (s38), the recording data processing circuit 25 generates the header field d1 including the second address data Ga or La given by the controller 20 as the sector data of the arrangement shown in (2f) and (2g) of FIG. 3. The recording data processing circuit 25 also generates the data field d3 shown in FIG. 3 by dividing the recording data still inputted at the terminal 12 through the host device interface 11 from the host device into predetermined sector sizes (e.g., 512 bytes), and then generating error correction codes and the like to be added to the data. Next, these generated data sequences are transmitted to the coil driver 14 as data for one sector which is modulated by a modulation circuit in the recording data processing circuit 25. The magnetic head 15 applies a modulated magnetic field in accordance with the sector data, while the optical head 22 radiates a light beam having power necessary for the recording. The desired sector data is thus recorded. After the recording of one sector is finished in (s38), the value of the Ga or La (i.e., the recording second address) is changed and then set in the head encoder 13b as the second address information in (s39). Then, the number of recording sectors WS is changed in (s40). In (s41), it is judged, by judging whether or not the WS equals 0, whether or not the recording is finished with respect to the designated number of sectors.

If the recording is finished here, the operation proceeds to (s42), and the recording processes are ended. On the other hand, if the recording is not finished yet, the operation goes back to (s37), and the above operation is repeated until the recording operation is completed with respect to the number of sectors designated by the host device.

Referring to FIG. 11, the following description will discuss reproduction operation. FIG. 11 is a flow block diagram showing a flow of the reproduction operation by the disk recording and reproducing device.

When a reproduction instruction is given from a host device through the terminal 12, the controller 20 recognizes the reproduction instruction through the host device interface 11 and starts processes for the reproduction operation (s50). In (s51), the controller 20 sets the reproduction block address Pa corresponding to the first address information according to the reproduction-starting designation logical address designated by the host device, and also sets the groove reproduction sector address Ga or the land reproduction sector address La corresponding to the second address information by converting the address as explained in FIG. 10. In (s52), the controller 20 sets the number of reproduced sectors designated by the host device as "RS". The controller 20, in (s53), sets the polarity of the tracking servo either to the groove or to the land in accordance with the judgement above, and, in (s54), performs access operation to the groove or the land including the Pa, i.e., the block position where the reproduction is to be performed. Next, in (s55), it is judged whether or not the present second address obtained from the second address decoder 9 agrees with the Ga or the La. If it agrees, the operation proceeds to (s56), wherein the desired sector is reproduced. Specifically, the reproduction data processing circuit 8 decodes the data field, including error correction processes. The decoded and corrected data field is then transmitted to the host device through the host device interface 11 and the terminal 12. After one sector is reproduced in (s56), the reproduction second address Ga or La, and the number of reproduced sectors RS are changed in (s57) and (s58). Then, it is judged, in (s59), whether or not the reproduction processes are finished with respect to the designated number of sectors. If it is finished, the operation proceeds to (s60). If it is not finished yet, the operation goes back to (s55), and the above processes are repeated until the reproduction operation is completed with respect to the desired sector.

As discussed so far, in the disk recording and reproducing device of the present embodiment, a disk recording medium having sectors of smaller sizes than the blocks can be realized by recording, into the block given by the first address information, a plurality of sectors generated by dividing recording data at a predetermined length and providing each piece of the divided recording data with second address information. In addition, it is possible to greatly increase the recording capacity by realizing recording into and reproduction out of both the groove and the land. Moreover, with the disk recording and reproducing device, it is possible to perform disk rotation control and access operation to unrecorded area into which no recording information is recorded by the constant linear velocity method by using the first address information, and to record and reproduce recording information sector by sector into and out of sectors of smaller sizes than the blocks, as well as to perform recording and reproduction by using the second address information with high reliability. Furthermore, with the disk recording and reproducing device, the logic sector address given by the host device can be converted into the first address information and the second address information of the groove or the land on the disk. Therefore, the host device can utilize the groove and the land as continuous sector address spaces without distinguishing the groove and the land. Convenience can be thus improved.

Fifth Embodiment

Referring to FIGS. 12 through 15, the following description will discuss a disk recording and reproducing device of a fifth embodiment in accordance with the present invention.

Figure 12:
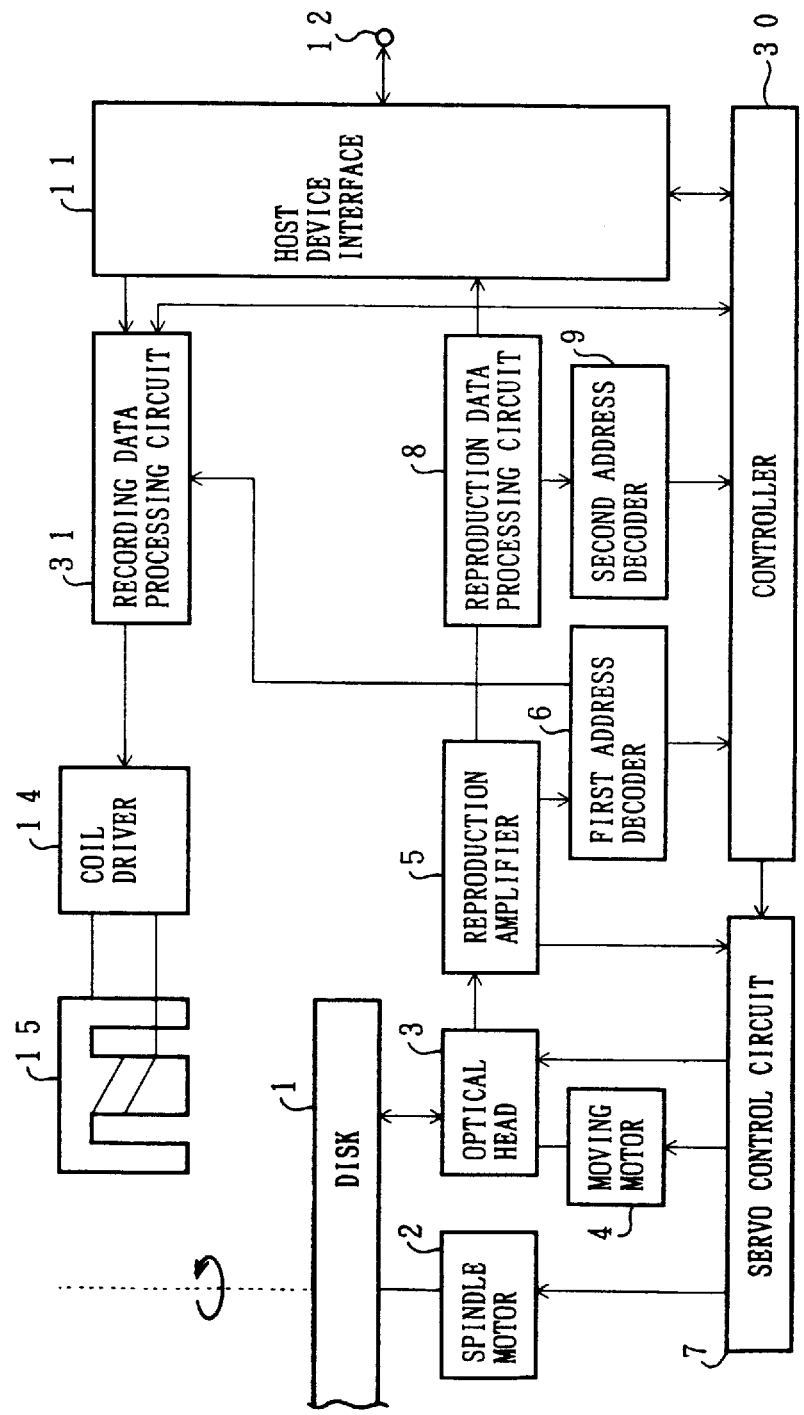
FIG. 12 is a block diagram showing a disk recording and reproducing device of a fifth embodiment in accordance with the present invention.

FIG. 12 shows an arrangement of a disk recording and reproducing device for recording and reproducing recording information into and out of the disk-shaped recording medium 1 of the configuration discussed in the first embodiment. The device includes: a spindle motor 2 for supporting and driving a magneto-optical disk 1 so that the disk rotates; an optical head 3 for, during reproduction, radiating laser beams to a desired position on the rotating magneto-optical disk 1 to detect light reflected from the magneto-optical disk 1 and for, during recording, radiating laser beams of higher power than during reproduction; a reproduction amplifier 5 for generating signals of various purposes (such as a reproduction data signal, a wobbling signal and a servo error signal) by amplifying detected signals fed from the optical head 3; a magnetic head 15 for applying a magnetic field to the magneto-optical disk 1 during recording; a moving motor 4 for moving the optical head 3 and the magnetic head 15 in radial directions of the magneto-optical disk 1; a servo control circuit 7 for controlling the rotation of the spindle motor 2, the focusing and tracking of the optical head 3 and the moving of the moving motor 4 in accordance with the wobbling signal, the servo error signal and the like from the reproduction amplifier 5 and an instruction from a controller 30; a first address decoder 6 for obtaining, by demodulating and decoding the wobbling signal from the reproduction amplifier 5, address information which permits detection of the light beam position on the magneto-optical disk 1; a host device interface 11 for receiving data recording and reproduction instructions, transmitting recording and reproduced data and the like from/to a host device through a terminal 12; a recording data processing circuit 31 for generating necessary data for recording in accordance with recording data from the host device interface 11, second address data from the controller 30 and the like, or initialization data generated inside the recording data processing circuit 31, and for modulating the data into a suitable form for recording; a coil driver 14 for driving the magnetic head 15 for generating a magnetic field in accordance with the recording data from the recording data processing circuit 31; a reproduction data processing circuit 8 for demodulating a reproduction data signal from the reproduction amplifier 5 and then transmitting a header field to a second address decoder 9 and for correcting errors with respect to a data field; a second address decoder 9 for decoding the second address information from the reproduction data processing circuit 8 and then transmitting the second address data to a controller 30; and a controller 30 for controlling various parts of the disk recording and reproducing device. All these parts are connected as shown in FIG. 12.

Figure 13:
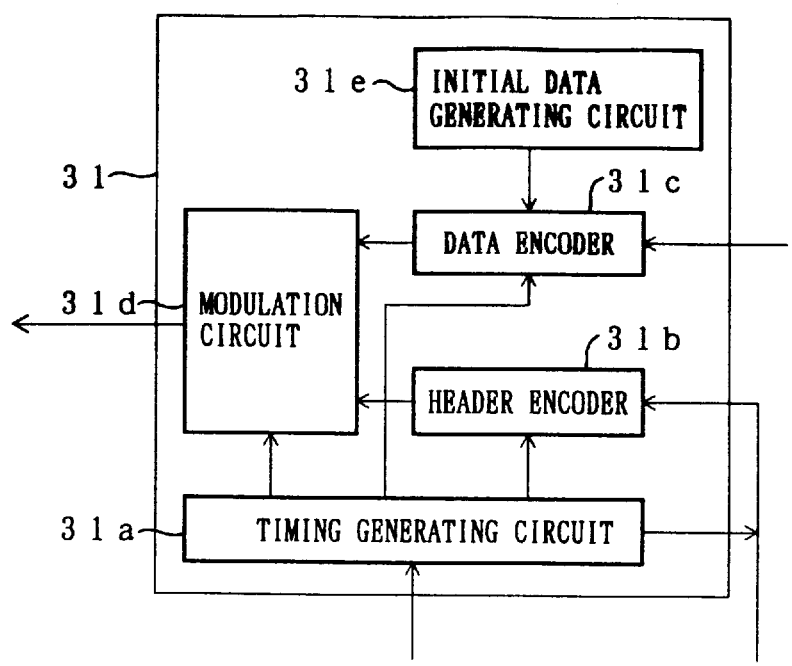
FIG. 13 is a block diagram showing in detail a recording data processing circuit of the disk recording and reproducing device of the fifth embodiment.

FIG. 13 is a block diagram showing in more details an arrangement of the recording data processing circuit 31, which is composed of: a timing generating circuit 31a for generating various timing data signals necessary for recording, and for outputting, in accordance with time passing for one block unit, sector counting information showing which sector is now being processed; a header encoder 31b for generating a header field showing the second address information from the second address data and the like out of the controller 30 in accordance with the timing signals out of the timing generating section 31a; a data encoder 31c for generating a data field by generating and adding an error correction code to the recording data out of the host device interface 11 or initialization data fed from an initial data generating circuit 31e; and a modulation circuit 31d for modulating the header field information out of the header encoder 31b or the data field information out of the data encoder 31c into a suitable form for recording. With the arrangement, in recording operation, the timing generating section 31a of the recording data processing circuit is controlled in accordance with the synchronization detection pulse detected from the first address information. More specifically, the timing generating circuit 31a is sequentially synchronized in accordance with the synchronization detection pulse of the first address information so that the block area shown in (1b) of FIG. 1 and the sector area shown as recording information in (1c) of FIG. 1 correspond to each other.

In the present embodiment, four sectors are allocated to one block. The blocks shown in (1b) are synchronized with the sectors shown in (1c) by inputting once for every four sectors a synchronization detection pulse of the first address information into the timing generating circuit 31a. Meanwhile, the timing generating circuit 31a outputs the sector counting information, which is initialized by the synchronization detection pulse of the first address information and fed to the controller 30 as sector information which adds up for every sector. More specifically, for example, referring to (1c), the counting number "0" is given to the sectors c1, c5 and so on: the counting number "1" is given to the sectors c2, c6 and so on: the counting number "2" is given to the sectors c3, c7 and so on: the counting number "3" is given to the sectors c4, c8 and so on.

The following description will discuss an embodiment of recording and reproduction operation by a disk recording and reproducing device having the above arrangement.

Figure 14:
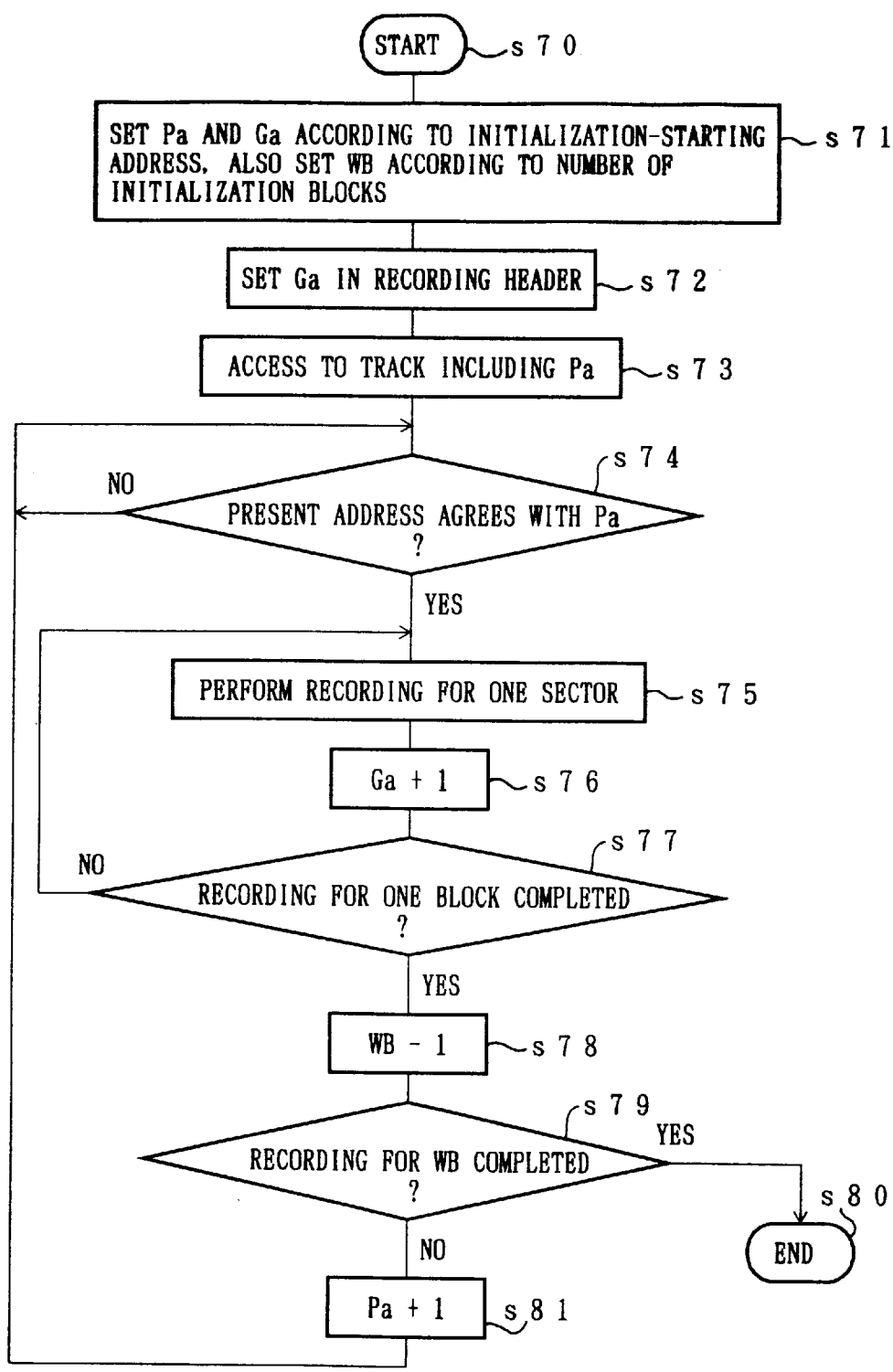
FIG. 14 is a flow block diagram showing initialization recording operation of the disk recording and reproducing device of the fifth embodiment.

FIG. 14 is a flow block diagram showing the flow of initialization recording operation by the disk recording and reproducing device.

When a initialization instruction is given from a host device through the terminal 12, the controller 30 recognizes the initialization instruction through the host device interface 11 and starts processes for the initialization recording operation (s70). In (s71), the controller 30 sets the initialization recording block address Pa corresponding to the first address information and the recording sector address Ga corresponding to the second address information according to the initialization record-starting designation address designated by the host device, and also sets the designated number of initialization recording blocks as "WB". The description here, as shown in FIG. 1, discusses a configuration in which four sectors are allocated to one block. For example, the block address value is set to ¼ of the sector address value. Next, in (s72), the controller 30 sets the Ga in the recording data processing circuit 31 as the second address data which is to be located at the beginning of the sector. In (s73), the controller 30 performs access operation to a track including the Pa, i.e., the block position where the initialization recording is to be performed. Referring to the access operation, the controller 30 moves the light beam to a desired position by recognizing the present first address obtained sequentially from the first address decoder 6 and controlling the moving motor 4 and the optical head 3 through the servo control circuit 7. Next, in (s74), it is judged whether or not the present first address obtained from the first address decoder 6 agrees with the Pa. If it agrees, the operation proceeds to (s75) and the sector-by-sector initialization recording is started. Here, while the following recording is performed, the block corresponding to the first address information and the sector corresponding to the second address information are always in synchronization. This is because, as noted above, the timing generating section in the recording data processing circuit 31 is synchronized in accordance with the results of the synchronization detection by the first address decoder 6. In (s75), the recording data processing circuit 31 generates the header field d1 including the second address data Ga given by the controller 30 as the sector data of the arrangement shown in (1d) and (1e) of FIG. 1. The recording data processing circuit 31 also generates the data field d3 shown in FIG. 1 by dividing the initialization data still generated inside the recording data processing circuit 31 into predetermined sector sizes (e.g., 512 bytes), and then generating error correction codes and the like to be added to the data.

Next, these generated data sequences are transmitted to the coil driver 14 as data for one sector modulated by the modulation circuit 31d. The magnetic head 15 applies a modulated magnetic field in accordance with the sector data, while the optical head 3 radiates a light beam having power necessary for the recording. The initialization recording is thus performed in the desired sector. After the initialization recording of one sector is finished in (s75), the value of the Ga (i.e., the initialization recording second address) is changed and then set in the head encoder 31b in (s76). Then, it is judged in (s77) whether the initialization recording operation of one block is finished. Since the description here discusses the case where one block is made up of four sectors, the recording of one block is completed by judging the sector accounting information obtained from the timing generating circuit 31a and repeating the operation of s75 through s77 until the recording of the four sectors is finished. In (s78), the number of initialization recording blocks WB is reduced. In (s79), it is judged whether the initialization recording is completed with respect to the number of recording blocks designated by the host device. If the initialization recording is finished here, the operation proceeds to (s80), wherein the initialization recording processes are ended. On the other hand, if it is not finished yet, the operation changes the initialization recording first address Pa and then goes back to (s74). Then, the above operation is repeated until the initialization recording is completed with respect to the number of blocks designated by the host device. If the initialization recording operation is performed only once like a conventional floppy disk device before the disk is used, the ordinary recording and reproduction operation (described next) can be realized sector by sector by using the second address.

Figure 15:
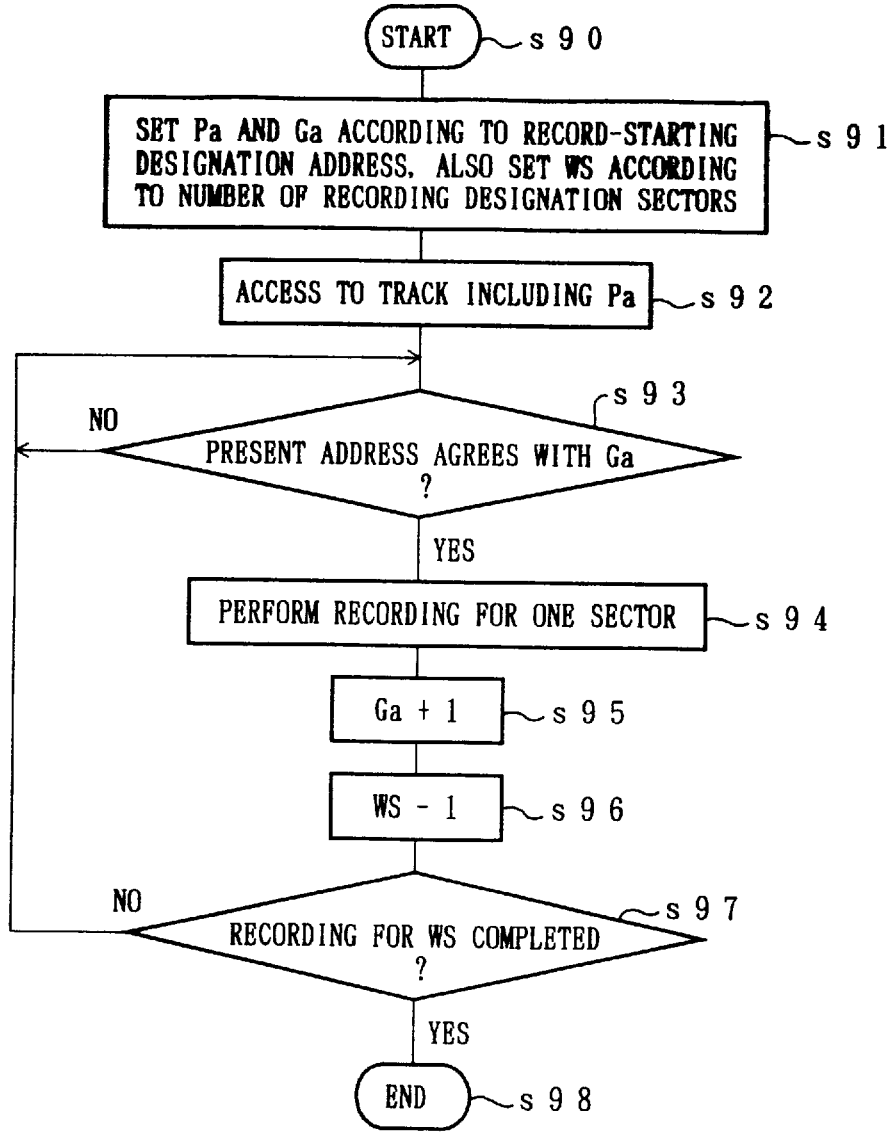
FIG. 15 is a flow block diagram showing recording operation of the disk recording and reproducing device of the fifth embodiment.

The following description will discuss ordinary recording operation. FIG. 15 is a flow block diagram showing the flow of the recording operation by the disk recording and reproducing device.

When a recording instruction is given from a host device through the terminal 12, the controller 30 recognizes the recording instruction through the host device interface 11 and starts processes for the recording operation (s90). In (s91), the controller 30 sets the recording block address Pa corresponding to the first address information and the recording sector address Ga corresponding to the second address information according to the record-starting address designated by the host device, and also sets the designated number of recording sectors as "WS". Next, in (s92), the controller 30 performs access operation to a track including the Pa, i.e., the block position where the recording is to be performed. In (s93), it is judged whether or not the present second address obtained from the second address decoder 9 agrees with the Ga. If it agrees, the operation proceeds to (s94) and the recording into the desired sector is started. The recording operation here is a recording of the part corresponding to the data field d3 in the sector data having the arrangement shown in (1d) of FIG. 1. The recording data processing circuit 31 generates the data field d3 shown in FIG. 1 by dividing the recording data inputted through the terminal 12 and the host device interface 11 from the host device into predetermined sector sizes (e.g., 512 bytes), and then generating error correction codes to be added to the data. The data for one sector is then transmitted to the coil driver 14. In this way, the magnetic head 15 applies a modulated magnetic field in accordance with the sector data, while the optical head 3 radiates a light beam of power necessary for the recording. The recording is thus performed in the desired sector. After recording of one sector is finished in (s94), the recoding second address Ga is changed and set in the head encoder 31b in (s95). Then, the number of recording-designated sectors WS is changed in (s96), and it is judged in (s97) whether or not the recording process is finished with respect to the number of recording-designated sectors.

If the recording is finished here, the operation proceeds to (s98). On the other hand, if the recording is not finished yet, the operation goes back to (s93), and the above operation is repeated until the recording operation with respect to the desired sector is completed.

Meanwhile, the reproduction operation enables the data of the desired sector to be reproduced by using the second address information in the same way as in the configuration discussed in FIG. 8.

As discussed so far, in the disk recording and reproducing device of the present embodiment, a disk recording medium having sectors of smaller sizes than the blocks can be realized by recording, into the block given by the first address information, a plurality of sectors generated by providing each piece of the initializing data with second address information during the initialization recording operation prior to the recording.

Moreover, with the disk recording and reproducing device, it is possible to perform disk rotation control and access operation to unrecorded area into which no recording information is recorded by the constant linear velocity method by using the first address information, and to record and reproduce, in a case where recording and reproduction is performed, recording information sector by sector into and out of sectors of smaller sizes than the blocks, as well as to perform sector-by-sector recording and reproduction by using the second address information with high reliability.

Sixth Embodiment

Referring to FIGS. 16 through 19, the following description will discuss a disk recording and reproducing device of a sixth embodiment in accordance with the present invention.

Figure 16:
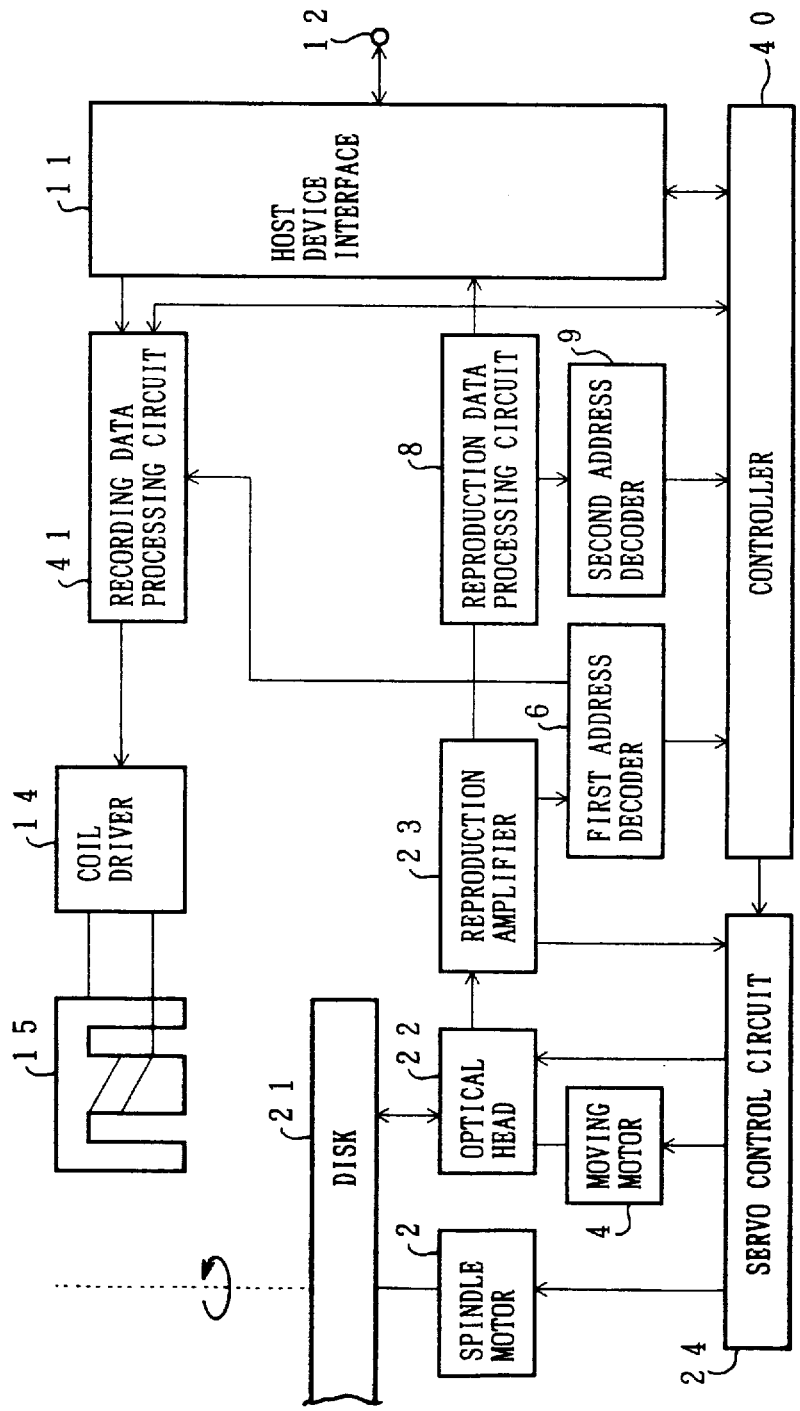
FIG. 16 is a block diagram showing a disk recording and reproducing device of a sixth embodiment in accordance with the present invention.

FIG. 16 shows an arrangement of a disk recording and reproducing device for recording and reproducing recording information into and out of the disk-shaped recording medium 21 of the configuration discussed in the second embodiment. The device includes: a spindle motor 2 for supporting and driving a magneto-optical disk 21 so that the disk rotates; an optical head 22 for, during reproduction, radiating laser beams to a desired position on the rotating magneto-optical disk 21 to detect light reflected from the magneto-optical disk 21 and for, during recording, radiating laser beams of higher power than during reproduction; a reproduction amplifier 23 for generating signals of various purposes (such as a reproduction data signal, a wobbling signal and a servo error signal) by amplifying detected signals fed from the optical head 22; a magnetic head 15 for applying a magnetic field to the magneto-optical disk 21 during recording; a moving motor 4 for moving the optical head 22 and the magnetic head 15 in radial directions of the magneto-optical disk 21; a servo control circuit 24 for controlling the rotation of the spindle motor 2, the focusing and tracking of the optical head 22 to a groove or a land and the moving of the moving motor 4 in accordance with the wobbling signal, the servo error signal and the like from the reproduction amplifier 23 and an instruction from a controller 40; a first address decoder 6 for obtaining, by demodulating and decoding the wobbling signal from the reproduction amplifier 23, address information which permits detection of the light beam position on the magneto-optical disk 21; a host device interface 11 for receiving data recording and reproduction instructions, transmitting recording and reproduced data and the like from/to a host device through a terminal 12; a recording data processing circuit 41 for generating necessary data for recording in accordance with either second address data from the controller 40 and recording data from the host device interface 11, or second address data from the controller 40 and initialization data generated inside the recording data processing circuit 41, and for modulating the data into a suitable form for recording; a coil driver 14 for driving the magnetic head 15 for generating a magnetic field in accordance with the recording data from the recording data processing circuit 41; a reproduction data processing circuit 8 for demodulating a reproduction data signal from the reproduction amplifier 23 and then transmitting header field information to a second address decoder 9 and for correcting errors with respect to data field information; a second address decoder 9 for decoding the second address information from the reproduction data processing circuit 8 and then transmitting the second address data to a controller 40; and a controller 40 for controlling various parts of the disk recording and reproducing device. All these parts are connected as shown in FIG. 16.

Note that the recording data processing circuit 41 can employ the same configuration with the recording data processing circuit 31 shown in FIG. 13. The description about details of the configuration of the recording data processing circuit 41 is therefore omitted. Nonetheless, in order to generate corresponding header information sequences shown in (2g) of FIG. 3, the recording data processing circuit 41 of the present embodiment is different from the recording data processing circuit 31 in, for example, the method of generating the flag fields with a data encoder 31c.

The following description will discuss an embodiment of the recording and reproduction operation by a disk recording and reproducing device having the above arrangement.

Figure 17:
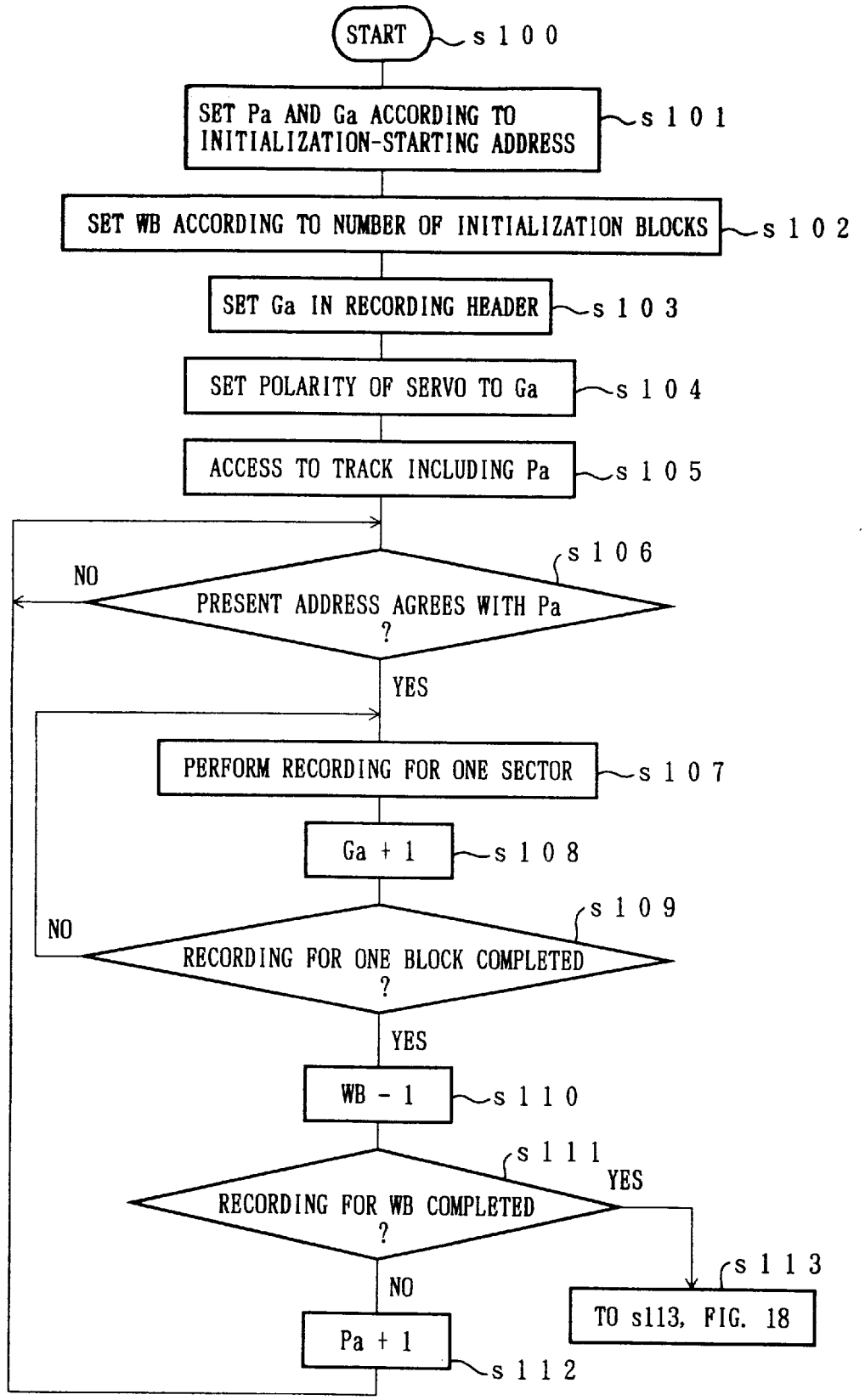
FIG. 17 is a flow block diagram showing initialization recording operation of the disk recording and reproducing device of the sixth embodiment.
Figure 18:
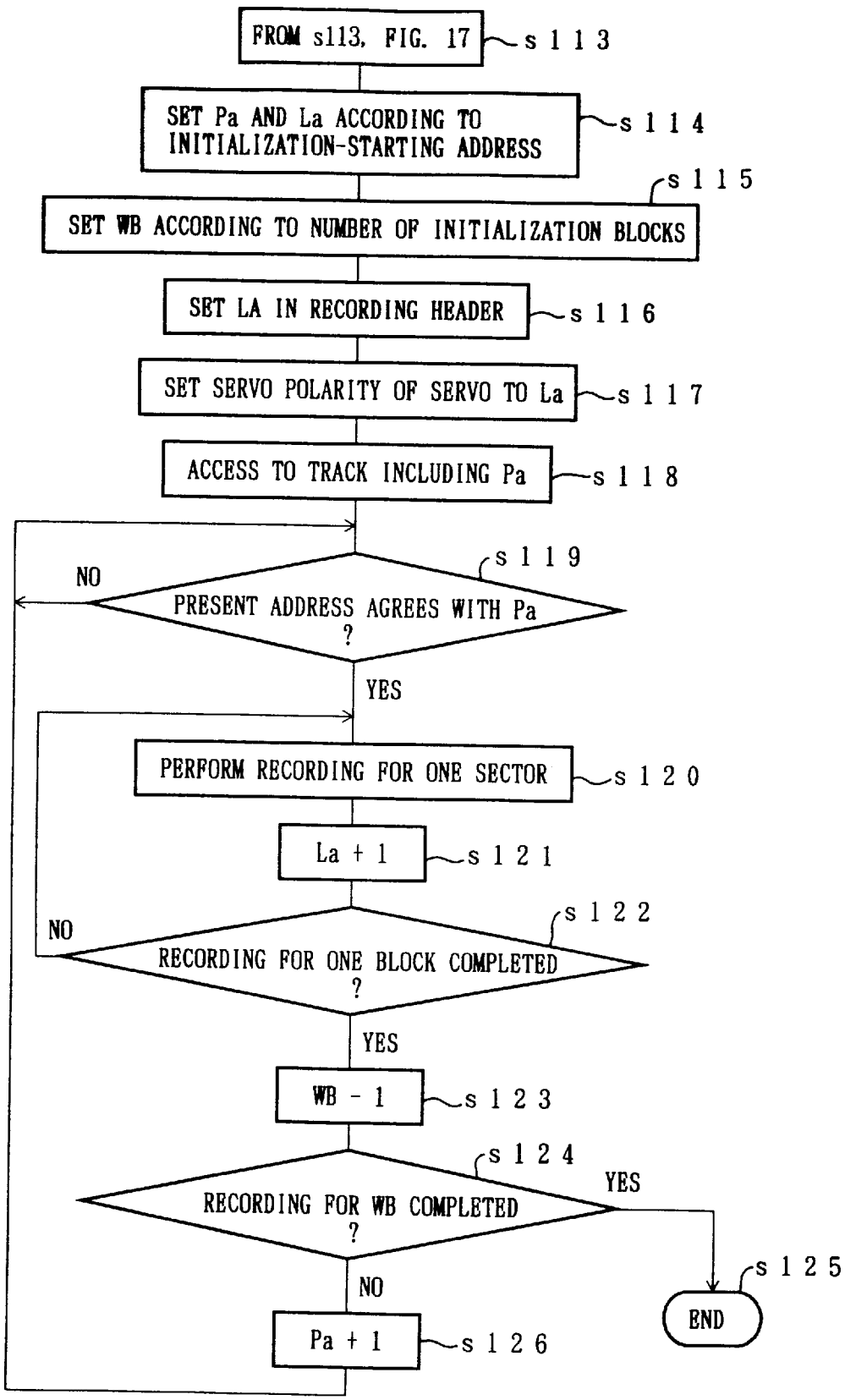
FIG. 18 is a flow block diagram showing initialization recording operation of the disk recording and reproducing device of the sixth embodiment.

FIGS. 17 and 18 are flow block diagrams showing the flow of initialization recording operation by the disk recording and reproducing device in accordance with an instruction from the host device. Here, the blocks on the disk and the sectors of the groove and the land, having the configuration discussed in FIG. 3, are given by the host device as continuous logical block address spaces and logical sector address spaces. Specifically, for example: If the groove and the land on the disk entire surface have 1,500,000 sectors respectively, the address numbers from "1" to "750,000" are given by the host device as logical block addresses (or the address numbers from "1" to "3,000,000" as logical sector addresses). The controller 40, upon reception of the logical block addresses (or the logical sector addresses) from "1" to "375,000" (or from "1" to "1,500,000" for the logical sector addresses), converts the logical block addresses (or the logical sector addresses) into the sector addresses of the groove. But, upon reception of the logical block addresses from "375,001" to "750,000" (or from "1,500,001" to "3,000,000" for the logical sector addresses), the controller 40 converts the logical block address (or the logical sector address) into the sector addresses of the land. In other words, the sector addresses, as discussed above, are divided between the groove and the land. As a result, if the sector addresses received by the controller 40 are those for the groove, the sector addresses can be designated to have the value four times of the logical block address (or the value of the logical sector addresses with no change). On the other hand, if the logical block addresses (or the logical sector addresses) received by the controller 40 are those for the land, the logical block addresses (or the logical sector addresses) are decreased by "375,000", multiplied by four (or decreased by "1,5000,000", not multiplied) and then designated as the sector addresses.

This address conversion enables the host device to handle the groove and the land as continuous blocks (or sectors) without distinguishing the groove and the land. Moreover, the description here discusses a configuration in which four sectors are allocated to one block as shown in FIG. 3, and it is possible to designate ¼ of the values of the sector addresses of the groove or the land as the block addresses Pa. Note that in the following description, it is assumed that an initialization recording instruction of the area including the sectors of both the groove and the land (which is similar to, for example, the initialization of the entire disk surface) is performed as an initialization recording instruction from the host device.

When a initialization recording instruction is given from a host device through the terminal 12, the controller 40 recognizes the initialization recording instruction through the host device interface 11 and starts processes for the initialization recording operation (s100).

In (s101), the controller 40 sets the initialization recording block address Pa corresponding to the first address information and the initialization recording sector address Ga corresponding to the second address information by performing the above-described address conversion according to the initialization record-starting designation address designated by the host device. Next, in (s102), the controller 40 sets the number of initialization recording blocks corresponding to the groove as "WB" from the number of initialization recording blocks designated by the host device. Then, in (s103), the controller 40 sets the above-obtained Ga in the recording data processing circuit 41 as the second address data which is to be located at the beginning of the sector and also sets identification information for the groove or the land as the flag fields g3 and g8 shown in (2g) of FIG. 3. Next, the controller 40, in (s104), sets the polarity of the tracking servo to the groove, and, in (s105), performs access operation to the groove including the Pa, i.e., the block position where the initialization recording is to be performed. Referring to the access operation, the controller 40 moves the light beam to a desired position by recognizing the present first address obtained sequentially from the first address decoder 6 and controlling the moving motor 4 and the optical head 22 through the servo control circuit 24. Next, in (s106), it is judged whether or not the present first address obtained from the first address decoder 6 agrees with the Pa. If it agrees, the operation proceeds to (s107) and the sector-by-sector initialization recording is started.

Here, while the following recording is performed, the block corresponding to the first address information and the sector corresponding to the second address information are always in synchronization. This is because, as noted above, the timing generating section in the recording data processing circuit 41 is synchronized in accordance with the results of the synchronization detection by the first address decoder 6.

In (s107), the sector data of the arrangement shown in (2f) and (2g) of FIG. 3 is generated. More specifically, the recording data processing circuit 41 generates the header field f1 including the second address data Ga given by the controller 40. Next, the initialization data generated inside the recording data processing circuit 41 is divided into predetermined sector sizes (e.g., 512 bytes). Then, error correction codes and the like are generated and added to the divided initialization data. The data field f3 is thus generated. Data for one sector, including the fields f1 and f3, is then transmitted to the coil driver 14. As a result, the magnetic head 15 applies a modulated magnetic field in accordance with the sector data, and the optical head 22 radiates a light beam having power necessary for the recording. The initialization recording of the desired sector is thus performed.

After the initialization recording of one sector is finished in (s107), the value of the Ga (i.e., the recording second address) is changed and then set in the recording data processing circuit 41 in (s108). Then, it is judged in (s109) from the sector counting information out of the recording data processing circuit 41 whether the recording operation of one block is finished. Since the description here discusses the case where one block is made up of four sectors, the recording of one block is completed by repeating the operation of s107 through s109 until the recording of the four sectors is finished. In (s110), the number of recording blocks WB is reduced. In (s111), it is judged whether the initialization recording is completed with respect to the number of blocks of the groove out of the number of the initialization recording blocks designated by the host device. If the initialization recording operation of the groove is not finished yet, the operation, in (s112), changes the initialization recording first address Pa and then goes back to (s106). Then, initialization recording of the groove is performed by repeating the above operation. If the initialization recording of the groove is finished, the operation proceeds to (s113) and proceeds to the initialization recording operation of the land. In (s114), the controller 40 sets the initialization recording block address Pa corresponding to the first address information and initialization recording sector address La corresponding to the second address information by performing the above address conversion. Next, in (s115), the controller sets the number of initialization recording blocks of the land out of the number of initialization recording blocks designated by the host device as "WB".

In (s116), the controller 40 sets the above-obtained Ga in the recording data processing circuit 41 as the second address data which is to be located at the beginning of the sector and also sets identification information for the groove or the land as the flag fields g3 and g8 shown in (2g) of FIG. 3. Next, the controller 40, in (s117), sets the polarity of the tracking servo to the land, and, in (s118), performs access operation to the land including the Pa, i.e., the block position where the initialization recording is to be performed. Next, similarly to the above-discussed initialization recording operation of the groove, in (s119), it is judged whether or not the first address agrees with the Pa. If it agrees, the sector-by-sector initialization recording is performed in (s120). In (s121), the value of the Ga (i.e., the recording second address) is changed and set in the recording data processing circuit 41. Then, it is judged in (s122) from the sector counting information out of the recording data processing circuit 41 whether the recording operation of one block is finished. The recording of one block is completed by repeating the operation of s120 through s122 until the recording of the four sectors is finished. In (s123), the number of initialization recording blocks WB is reduced. In (s124), it is judged whether the initialization recording is completed with respect to the number of blocks of the land out of the number of the initialization recording blocks designated by the host device. If the initialization recording operation of the land is finished here, the operation proceeds to (s125), and the initialization recording processes are ended. On the other hand, if the initialization recording operation of the land is not finished yet, the initialization recording first address Pa is changed in (s126), and then the operation goes back to (s119). Then, the initialization recording of the land is performed by repeating the above operation. If the initialization recording operation is performed only once like a conventional floppy disk device before the disk is used, the ordinary recording and reproduction operation (described next) can be realized sector-by-sector by using the second address.

Figure 19:
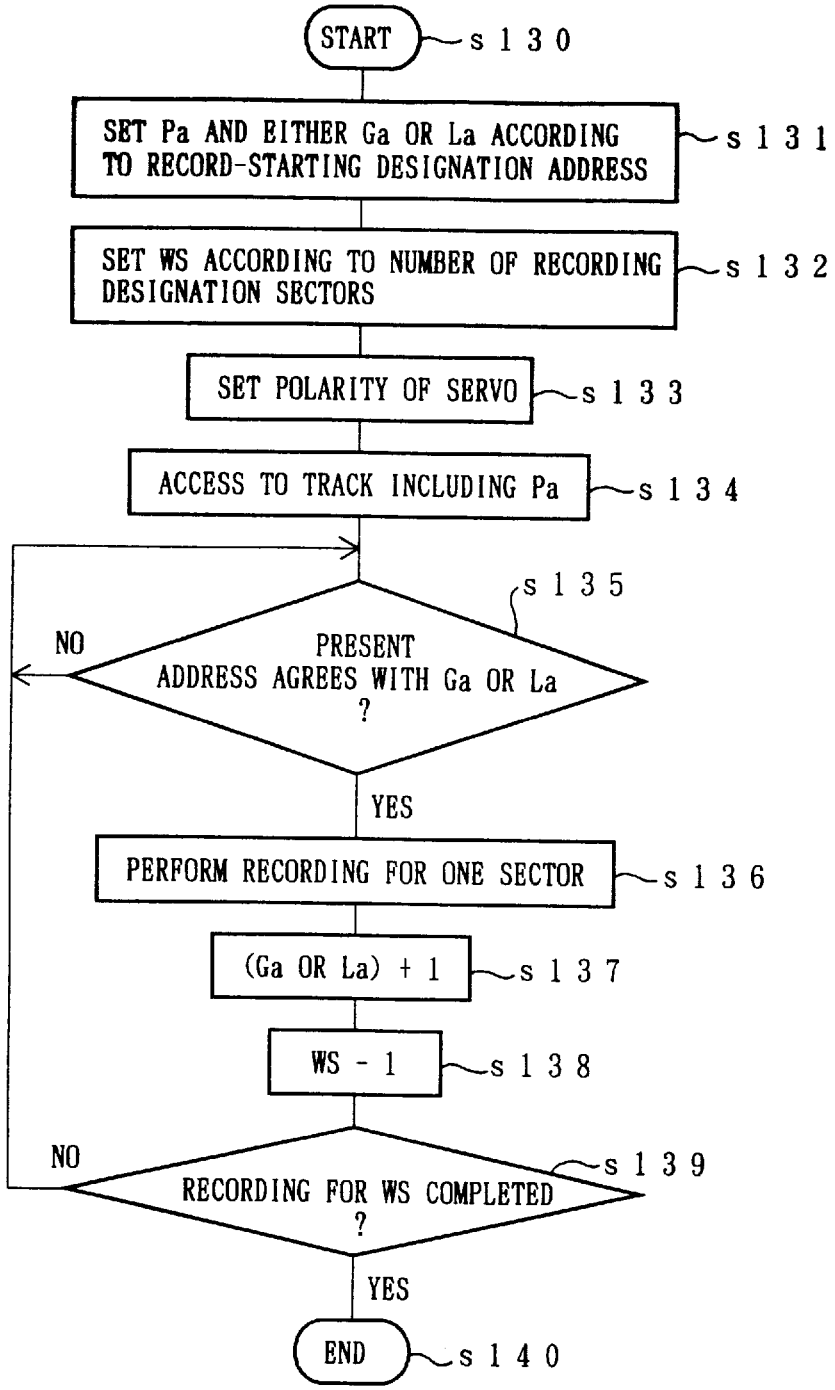
FIG. 19 is a flow block diagram showing recording operation of the disk recording and reproducing device of the sixth embodiment.
Figure 20:
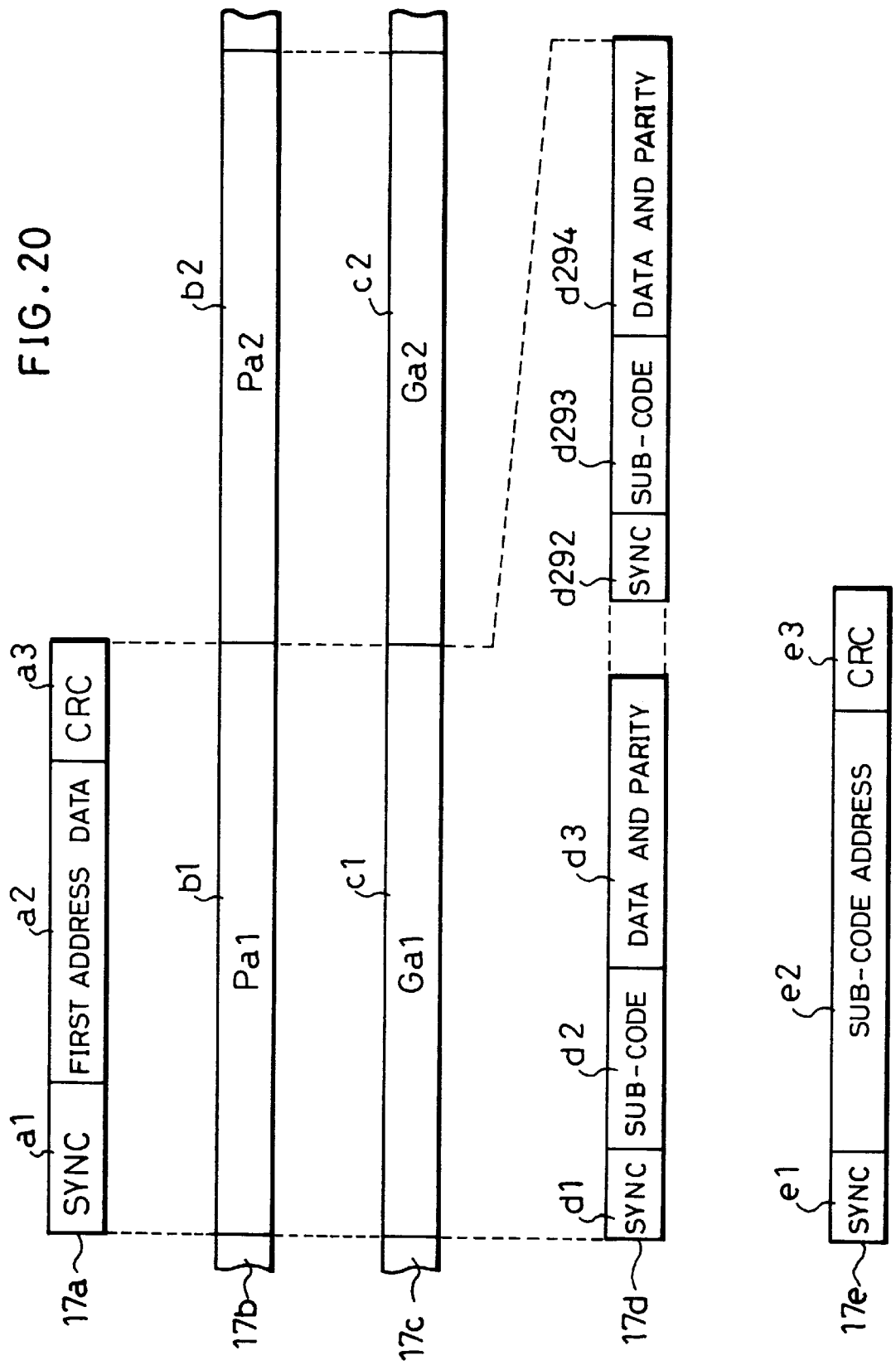
FIG. 20 is a drawing showing an arrangement of address information used in a conventional disk-shaped recording medium.
Figure 21:
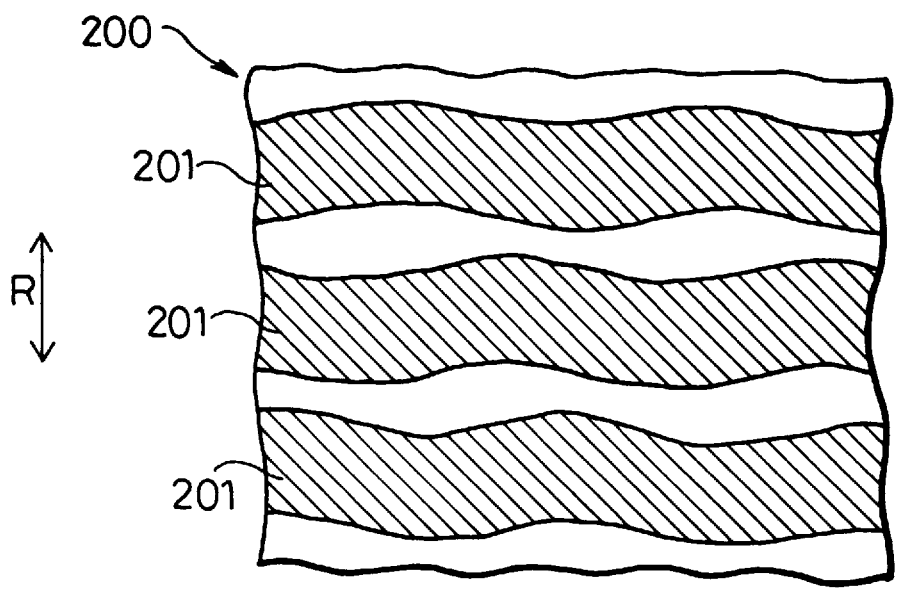
FIG. 21 is a drawing showing a configuration of a groove of the conventional disk-shaped recording medium.
Figure 22:
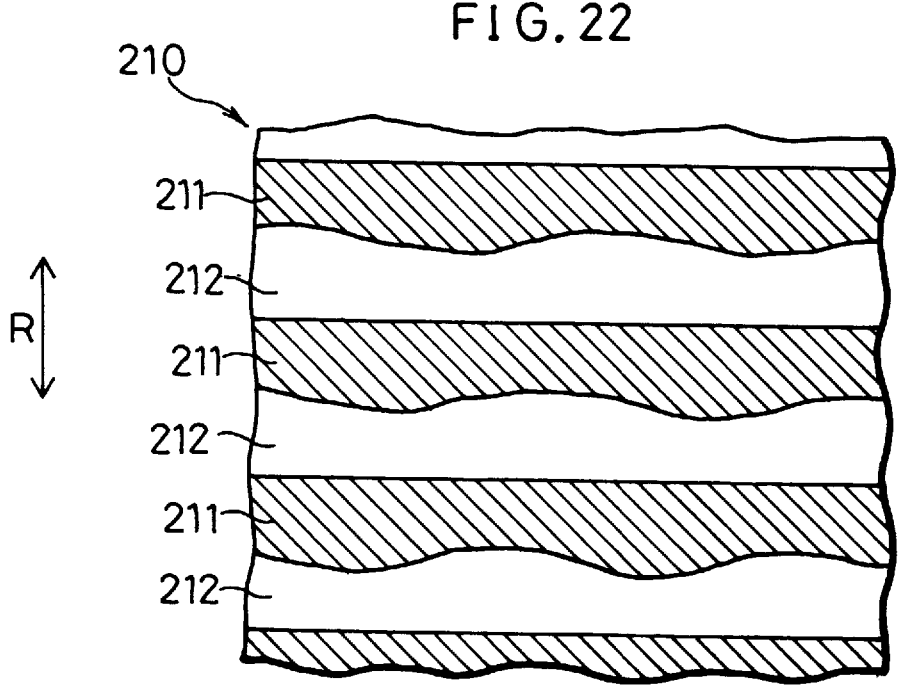
FIG. 22 is a drawing showing a configuration of a groove of another conventional disk-shaped recording medium.

The following description will discuss ordinary recording operation. FIG. 19 is a flow block diagram showing the flow of the recording operation by the disk recording and reproducing device.

When a recording instruction is given from a host device through the terminal 12, the controller 40 recognizes the recording instruction through the host device interface 11 and starts processes for the recording operation (s130). In (s131), the controller 40 sets the recording block address Pa corresponding to the first address information and either the recording sector address of the groove Ga or the recording sector address of the land La corresponding to the second address information by converting the above record-starting designation logical address designated by the host device. In (s132), the controller 40 sets the number of recorded sectors designated by the host device as "RS". Next, in (s133), the controller 40 sets the polarity of the tracking servo in accordance with the result of the above judgement whether the logical sector addresses are for the groove or the land. In (s134), the controller 40 performs access operation to the groove or the land including the Pa, i.e., the block position where the recording is to be performed. In (s135), it is judged whether or not the present second address obtained from the second address decoder 9 agrees with the Ga or the La. If it agrees, the operation proceeds to (s136), wherein the recording into the desired sector is started. The recording operation here is a recording of the part corresponding to the data field f3 in the sector data having the arrangement shown in (2f) of FIG. 3. The recording data processing circuit 41 generates the data field f3 shown in FIG. 3 by dividing the recording data inputted through the terminal 12 and the host device interface 11 from the host device into predetermined sector sizes (e.g., 512 bytes), and then generating error correction codes to be added to the data. The data for one sector is then transmitted to the coil driver 14. In this way, the magnetic head 15 applies a modulated magnetic field in accordance with the sector data, while the optical head 3 radiates a light beam of power necessary for the recording. The recording of the desired sector is thus performed.

After the recording of one sector is finished in (s136), the recoding second address Ga or La is changed and set in the recording data processing circuit 41 in (s137). Then, the designated number of recording sectors WS is changed in (s138), and it is judged in (s139) whether or not the recording process is finished with respect to the designated number of recording sectors. If the recording is finished here, the operation proceeds to (s140). On the other hand, if the recording is not finished yet, the operation goes back to (s135), and the recording operation of the desired sector is performed by repeating the above operation.

Meanwhile, the reproduction operation enables the data of the desired sector to be reproduced by using the second address information in the same way as in the configuration discussed in FIG. 11.

As discussed so far, in the disk recording and reproducing device of the present embodiment, a disk recording medium having sectors of smaller sizes than the blocks can be realized by recording, into the block given by the first address information, a plurality of sectors generated by dividing recording data at a predetermined length and providing each piece of the divided recording data with second address information. Besides, the recording capacity can be greatly increased by realizing the recording and reproduction using both the land and the groove. Moreover, with the disk recording and reproducing device, it is possible to perform disk rotation control and access operation to unrecorded area into which no recording information is recorded by the constant linear velocity method by using the first address information, and to record and reproduce recording information sector by sector into and out of sectors of smaller sizes than the blocks, as well as to perform the sector-by-sector recording and reproduction by using the second address information with high reliability.

The above description has been made in a processing configuration where the sectors of both the groove and the land are sequentially initialized with the assumption that an initialization recording instruction of the area including the sectors of both the groove and the land (which is similar to, for example, the initialization of the entire disk surface) is performed as an initialization recording instruction from the host device. Nevertheless, other processing configurations are also possible. For example, it is obvious that a processing configuration where the sectors of only either the groove or the land are initialized in accordance with such an initialization recording instruction.

As discussed above, the disk-shaped recording medium of the first embodiment is a disk-shaped recording medium having (1) the first address information prerecorded in the configuration in which side-walls wobble or deviate in radial directions of the disk, (2) the block area given the first address information, and (3) the sector area provided with the second address information for every piece of the recording data which is divided into predetermined lengths. The disk-shaped recording medium is further has 'm' pieces of sector areas which are allocated for 'n' pieces of block areas and recorded in the groove (wherein both n and m are integral numbers, and n is smaller than m).

For these reasons, it is possible to perform the recording into and reproduction out of a sector having a smaller size than the blocks corresponding to the first address information, and to provide the second address information with high reliability as the address information for the sectors. Besides, since it is possible to perform the sector-by-sector recording into and reproduction out of sectors of appropriate sizes for various purposes into and out of one kind of disk-shaped recording medium into which the first address information is prerecorded, it is needless to prepare disks for sectors of various sizes. The price of the disk is thus cut down. Moreover, since it is possible to set the block size and the sector size independently, such a disk can be more freely used: for example, improving reliability by adding an error detection code as the first address information, performing a multiple recording (i.e. recording more than once) and/or the like.

Moreover, the disk-shaped recording medium of the second embodiment is a disk-shaped recording medium having (1) the first address information prerecorded in the configuration in which only one side-wall of the groove wobbles or deviates in radial directions of the disk, (2) the block areas of the groove, and (3) the land given the first address information and the sector area provided with the second address information for every piece of the recording data which is divided into predetermined lengths. The disk-shaped recording medium further has 'm' pieces of sector areas which are allocated for 'n' pieces of block areas and recorded in the groove and the land (wherein both n and m are integral numbers, and n is smaller than m).

For these reasons, it is possible to perform the recording into and reproduction out of a sector of both the groove and the land having a smaller size than the blocks corresponding to the first address information. Therefore, a disk recording medium of a great capacity and of any sector size is realized, and it is possible to provide the second address information with high reliability as the address information for the sectors. Besides, since it is possible to perform the sector-by-sector recording into and reproduction out of sectors of appropriate sizes for various purposes with respect to one kind of disk-shaped recording medium into which the first address information is prerecorded, it is needless to prepare disks for sectors of various sizes, the price of the disk is thus cut down. Moreover, since it is possible to set the block size and the sector size independently, such a disk can be more freely used: for example, improving reliability by adding an error detection code as the first address information, performing a multiple recording (i.e. recording more than once) and/or the like.

Moreover, in the disk-shaped recording medium of the second embodiment, the second address information may include the same second address values in accordance with the land and the groove of the same first address values.

With this configuration, the land and the groove of the same first address value share the same second address value. As a result, in a disk recording or reproducing device using such a disk, it is possible to easily exchange the first address value and the second address value corresponding to the first address value.

Meanwhile, in the disk-shaped recording medium of the second embodiment, the groove and the land may have a different second address value from each other. With this configuration, it is possible to easily distinguish the groove and the land with the second address values.

Besides, in the disk-shaped recording medium of the first and second embodiments, the first address information is provided by the constant linear velocity method. With this configuration, in a disk recording or reproducing device using such a disk, it is possible to control the rotation of the disk by the constant linear velocity method without using neither means detecting the number of rotation of the disk nor means detecting the position along the disk radius. It is also possible for the entire recording medium to have a greater recording capacity than a recording medium made by the constant angular velocity method.

Moreover, the disk recording and reproducing device of the third embodiment is a disk recording and reproducing device using a disk-shaped recording medium having the first address information prerecorded in the configuration in which side-walls of the groove wobble or deviate in radial directions of the disk. The device generates a plurality of pieces of second address information in accordance with the first address information reproduced from the recording medium, adds that second address information to every piece of recording data of a predetermined length, and records the recording data provided with the second address information as a sector. The device also reproduces the recording data sector by sector in accordance with the second address information.

With this configuration, it is possible to realize the sector-by-sector recording and reproduction of data into and out of sectors of smaller sizes than blocks corresponding to the first address information. It is also possible to minimize the decrease of data utilization factor even in a recording of data of a small size. It is also possible to minimize the processing time needed for the recording and reproduction of data. Besides, the second address information given as the address information for the sector is effective in improving reliability in identification of the sector address with respect to reproduction of the recording data.

Moreover, the disk recording and reproducing device of the fourth embodiment, is a disk recording and reproducing device using a disk-shaped recording medium having the first address information prerecorded in the configuration in which only one side-wall of the groove wobbles or deviates in radial directions of the disk. The device generates a plurality of pieces of different second address information for the groove and the land in accordance with the first address information reproduced from the recording medium, adds that second address information to every piece of recording data of a predetermined length, and records the recording data provided with the second address information as a sector. The device also reproduces the recording data sector by sector in accordance with the second address information.

With this configuration, it is possible to realize a disk recording and reproducing device of a great capacity wherein it is possible to perform the sector-by-sector recording and reproduction into and out of a sector of both the groove and the land having a smaller size than the blocks corresponding to the first address information. It is thus possible to minimize the decrease of data utilization factor even in a recording of data of a small size. It is also possible to minimize the processing time needed for the recording and reproduction of the data. Beside, since the second address information given as the address information for the sector is effective in improving reliability in identification of the sector address with respect to reproduction of the recording data. Moreover, since different second address information is generated and recorded for the groove and the land, it is possible to perform a judgement of the groove and the land with high reliability.

Meanwhile, the disk recording and reproducing device of the fifth embodiment is a disk recording and reproducing device using a disk-shaped recording medium having the first address information prerecorded in the configuration in which side-walls of the groove wobble or deviate in radial directions of the disk. The device generates a plurality of pieces of second address information in accordance with the first address information reproduced from the recording medium, adds that second address information to every piece of recording data of a predetermined length, and records the recording data provided with the second address information as a sector. The device also reproduces the recording data sector by sector in accordance with the second address information.

With this configuration, it is possible to realize the sector-by-sector recording and reproduction of data into and out of sectors of smaller sizes than blocks corresponding to the first address information. It is also possible to minimize the decrease of data utilization factor even in a recording of data of a small size. It is also possible to minimize the processing time needed for the recording and reproduction of data. Besides, the second address information given as the address information for the sector is effective in improving reliability in identification of the sector address with respect to reproduction of the recording data.

Moreover, the disk recording and reproducing device of the sixth embodiment, is a disk recording and reproducing device using a disk-shaped recording medium having the first address information prerecorded in the configuration in which only one side-wall of the groove wobbles or deviates in radial directions of the disk. The device generates a plurality of pieces of different second address information for the groove and the land in accordance with the first address information reproduced from the recording medium, adds that second address information to every piece of recording data of a predetermined length, and records the recording data provided with the second address information as a sector. The device also reproduces the recording data sector by sector in accordance with the second address information.

With this configuration, it is possible to realize a disk recording and reproducing device of a great capacity wherein it is possible to perform the sector-by-sector recording and reproduction into and out of a sector of both the groove and the land having a smaller size than the blocks corresponding to the first address information. It is thus possible to minimize the decrease of data utilization factor even in a recording of data of a small size. It is also possible to minimize the processing time needed for the recording and reproduction of the data. Beside, since the second address information given as the address information for the sector is effective in improving reliability in identification of the sector address with respect to recording and reproduction of ordinary recording data. Moreover, since different second address information is generated and recorded for the groove and the land, it is possible to perform a judgement of the groove and the land with high reliability.

Moreover, the disk recording and reproducing device of the third through sixth embodiments perform synchronization of the recording sectors including the second address information in accordance with the first address information obtained during the recording. For this reason, the blocks corresponding to the first address information is always in synchronization with the sectors corresponding to the second address information when data can be recorded in the disk.

Moreover, the disk recording and reproducing device of the third through sixth embodiments control the rotation of the disk in accordance with the first address information. For this reason, it is possible to control the rotation of the disk by the constant linear velocity method without using neither means detecting the number of rotation of the disk nor means detecting the position of the disk radius.

Moreover, the disk recording and reproducing device of the fourth or sixth embodiment distinguish the land and the groove from the recording and reproduction designation address from the host device, and convert data into different second address information for the land and the groove.

For this reason, it is possible to select the groove or the land predetermined and corresponding to the recording and reproduction address designated by the host device, to perform access operation to the blocks corresponding to the first address information and to perform recording and reproduction operation into and out of sectors corresponding to any address information. The host device need not distinguish the groove and the land and can to handle the groove and the land as a continuous sector group, thereby increasing the convenience.

Moreover, the above embodiments are not restrictive of the present invention. Various changes and modifications within the spirit and scope of the invention are possible. For example, in the embodiments, four sectors including the second address information have been allocated to a block corresponding to the first address information. It is, however, possible to allocate any number of sectors (more than one sector) to one block. It is also possible to allocate five sectors to two blocks. Similarly, in the above embodiments, the same address value has been recorded twice as an arrangement example of the second address information. The address value, however, may be recorded as many times as necessary to obtain enough reliability. In addition, the configuration has been explained wherein CRC fields (error detection code) are provided to the address data as the arrangement of the first address information or of the second address information. The reliability may, however, be improved by adding error correction code to the address data. Moreover, the case where a magneto-optical disk-shaped recording medium is used has been explained. However, it is obvious that the embodiments can be adopted in a disk-shaped recording medium employing the phase change technique. Furthermore, the embodiments produce similar effect when adopted not only in a recording and reproducing device which is capable of performing both recording and reproduction, but also in a device which is capable of performing at least recording, reproduction, or initialization.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. A disk-shaped recording medium, comprising:
    a plurality of readable and writable block areas provided on the medium;
    a groove section at least one of whose side-walls wobble(s) or deviate(s) in radial directions of the medium for prerecording a first address information including first address value allocated to each of the block areas;
    a plurality of sector areas, provided in the block areas, of lengths that are specified so as to form a constant ratio to lengths of the block areas;
    a second address information area, provided in each of the sector areas, for recording second address information including a second address value for distinguishing each of the sector areas from the rest of the sector areas; and
    a data area, provided in each of the sector areas for recording data.

2. The disk-shaped recording medium as defined in claim 1,
    wherein the block areas are provided in the groove section, and
    each piece of the first address information corresponds one-to-one to each of the block areas.

3. The disk-shaped recording medium as defined in claim 1,
    wherein each of the second address information areas has an area for recording the second address value more than once.

4. The disk-shaped recording medium as defined in claim 1,
    wherein each of the second address information area has an area for recording an error detection code for the second address information.

5. The disk-shaped recording medium as defined in claim 1,
    wherein the first address information is prerecorded by the constant linear velocity method to control the rotation speed of the disk-shaped recording medium at constant linear velocity.

6. The disk-shaped recording medium as defined in claim 1, wherein a constant number of sector areas are allocated to each of the block areas.

7. A disk-shaped recording medium comprising:
    a plurality of readable and writable block areas provided on the medium;
    a groove section at least one of whose side-walls wobble(s) or deviate(s) in radial directions of the medium for prerecording a first address information including first address value allocated to each of the block areas;
    a plurality of sector areas, provided in the block areas, of sizes smaller than each of the block areas;
    a second address information area, provided in each of the sector areas, for recording second address information including a second address value for distinguishing each of the sector areas from the rest of the sector areas;
    a data area, provided in each of the sector areas for recording data; and
    wherein the block areas are provided in the groove section and in a land section between adjacent parts of the groove section, and
    the first address information including the first address value allocated to each of the block areas in the groove section and each of the block areas in the land section which corresponds to that part of the groove section is prerecorded in a configuration in which only one of the side-walls of the groove section wobbles or deviates in radial directions of the medium.

8. The disk-shaped recording medium as defined in claim 7,
    wherein the second address value included in the second address information recorded in the second address information area of the sector area in the groove section is different from the second address value included in the second address information recorded in the second address information area of the sector area in the land section.

9. The disk-shaped recording medium as defined in claim 8, wherein the second address values allocated to the sector areas are specified so the second address values are continuous in groove sector areas provided to the groove section and also continuous in land sector areas provided to the land section, and that an address space of the groove sector area and an address space of the land sector area are continuous.

10. The disk-shaped recording medium as defined in claim 7,
    wherein the second address value included in the second address information recorded in the second address information area of the groove sector area provided in the block area of the groove section is the same with the second address value included in the second address information recorded in the second address information area of the land sector area corresponding to the groove sector area and provided in the block area of the land section corresponding to the same first address information as the block area of the groove section.

11. The disk-shaped recording medium as defined in claim 10, wherein the second address information area is provided with a flag area for storing a flag for showing whether the corresponding sector area is located in the groove section or in the land section.

12. The disk-shaped recording medium as defined in claim 7, wherein each of the second address information areas has an area for recording the second address value more than once.

13. The disk-shaped recording medium as defined in claim 7, wherein each of the second address information areas has an area for recording an error detection code for the second address information.

14. The disk-shaped recording medium as defined in claim 7, wherein the first address information is prerecorded by the constant linear velocity method.

* * * * *